(12) United States Patent
Wetzel et al.

(10) Patent No.: US 8,811,811 B1
(45) Date of Patent: Aug. 19, 2014

(54) CAMERA SYSTEM AND METHOD FOR GENERATING HIGH-QUALITY HDR IMAGES OR VIDEOS

(71) Applicant: Fraunhofer-Gesellschaft zur Foerderung der angewandten Forschung e.V., Munich (DE)

(72) Inventors: Marcus Wetzel, Nuremberg (DE); Joachim Keinert, Nuremberg (DE); Siegfried Foessel, Erlangen (DE)

(73) Assignee: Fraunhofer-Gesellscahft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/945,368

(22) Filed: Jul. 18, 2013

(51) Int. Cl.
*G03B 41/00* (2006.01)

(52) U.S. Cl.
USPC ............................................. 396/322

(58) Field of Classification Search
USPC ............................................. 396/322
See application file for complete search history.

(56) References Cited

U.S. PATENT DOCUMENTS

| | | | |
|---|---|---|---|
| 7,146,059 B1 * | 12/2006 | Durand et al. | 382/260 |
| 7,492,391 B1 * | 2/2009 | Kaplinsky | 348/218.1 |
| 7,495,699 B2 | 2/2009 | Nayar et al. | |
| 7,804,530 B2 * | 9/2010 | Pryor | 348/239 |
| 8,208,048 B2 | 6/2012 | Lin et al. | |
| 2010/0150473 A1 * | 6/2010 | Kwon et al. | 382/284 |
| 2011/0211732 A1 * | 9/2011 | Rapaport | 382/107 |
| 2012/0162366 A1 | 6/2012 | Ninan et al. | |
| 2012/0176481 A1 * | 7/2012 | Lukk et al. | 348/47 |
| 2012/0281031 A1 * | 11/2012 | Clodfelter | 345/690 |
| 2013/0242059 A1 * | 9/2013 | Dahi et al. | 348/47 |
| 2013/0314568 A1 * | 11/2013 | Vranceanu et al. | 348/239 |
| 2014/0132735 A1 * | 5/2014 | Lee et al. | 348/47 |

FOREIGN PATENT DOCUMENTS

WO 03/083773 A2 10/2003

OTHER PUBLICATIONS

Mantiuk et al., "High Dynamic Range Imaging Pipeline: Perception-Motivated Representation of Visual Content," Human Vision and Electronic Imaging XII, 2007, 12 pages.
Riechert et al., "Fully Automatic Stereo-to-Multiview Conversion in Autostereoscopic Displays," IBC 2012, 9 pages.
Bonnard et al., "High-Dynamic Range Video Acquisition with a Multiview Camera," Optics, Photonics, and Digital Technologies for Multimedia Applications II, 2012, 11 pages.

* cited by examiner

Primary Examiner — Rodney Fuller
(74) Attorney, Agent, or Firm — Keating & Bennett, LLP

(57) ABSTRACT

A system for generating an output image is provided. A first camera of a camera pair is configured to record a first portion of a scene to obtain a first recorded image. A second camera of the camera pair is configured to record a second portion of the scene to obtain a second recorded image. Moreover, a central camera is configured to record a further portion of the scene, to obtain a central image. A processor is configured to generate the output image. The first brightness range of the first camera of each camera pair is different from the central-camera brightness range and is different from the first brightness range of the first camera of any other camera pair of the one or more camera pairs.

20 Claims, 18 Drawing Sheets

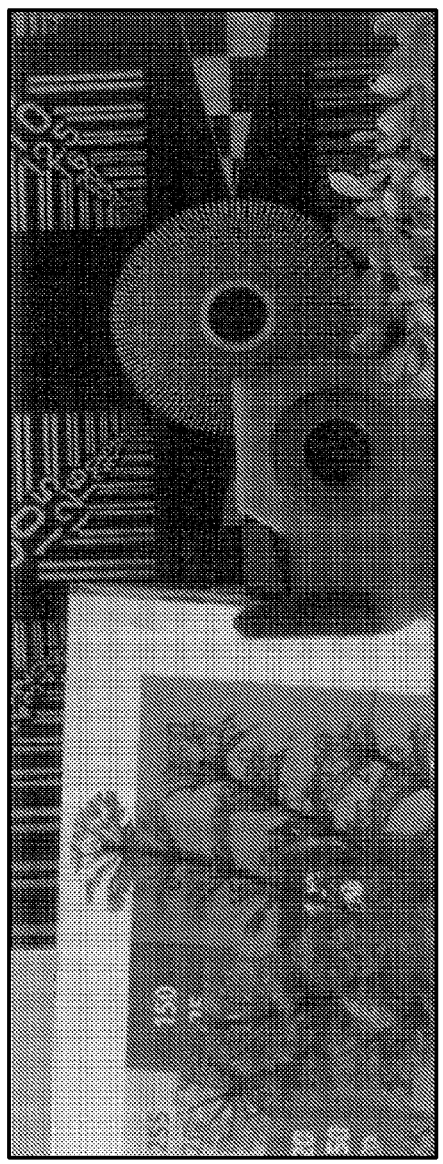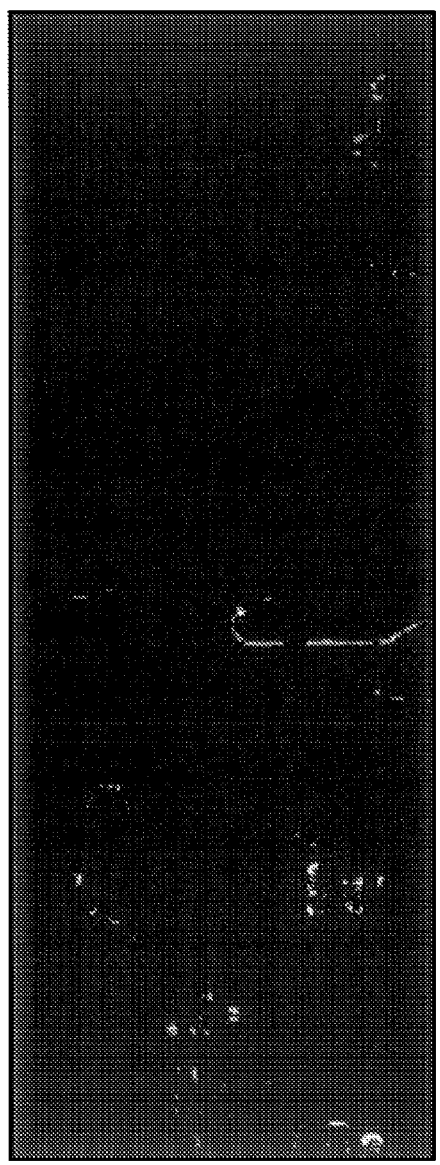
FIG 16A
FIG 16B

CAMERA SYSTEM AND METHOD FOR GENERATING HIGH-QUALITY HDR IMAGES OR VIDEOS

BACKGROUND OF THE INVENTION

The present invention relates to image recording and video recording and processing, and, in particular, to a camera system and method for generating high-quality images or videos.

Regarding image and video recording, frequently, the dynamic range of cameras is not sufficient so as to be able to record a scene accurately. The consequence is underexposure of dark parts of an image and overexposure of bright parts of an image.

Different approaches of bypassing this problem are possible. In general, a higher dynamic range of a camera entails corresponding costs: either the sensor has to support fast readout or it requires large pixel cells or it decreases in resolution.

However, a decrease in resolution is not acceptable when a maximum dynamic range is required.

In the prior art, [4] describes a method for high dynamic range imaging.

In [5] and [6] a camera array of different exposing sensitivities is described.

In [3], a complex way of high-dynamic range video acquisition is described, which requires a considerable amount of hardware and software resources.

In [7], a stereo camera is used for generating HDR video, where objects may not be visible in both cameras, and thus determining the disparity and correction is not possible.

It would be highly appreciated if improved concepts for efficient high-dynamic range image acquisition would be provided.

SUMMARY

According to an embodiment, a system for generating an output image is provided. A first camera of a camera pair is configured to record a first portion of a scene to obtain a first recorded image. A second camera of the camera pair is configured to record a second portion of the scene to obtain a second recorded image. Moreover, a central camera is configured to record a further portion of the scene, to obtain a central image. A processor is configured to generate the output image. The first brightness range of the first camera of each camera pair is different from the central-camera brightness range and is different from the first brightness range of the first camera of any other camera pair of the one or more camera pairs.

In an embodiment, a system for generating an output image is provided. The system comprises one or more camera pairs, wherein each camera pair of the one or more camera pairs comprises a first camera and a second camera, wherein said first camera is located at a first position, wherein said first camera is configured to record a first portion of a scene to obtain a first recorded image of said camera pair, wherein said second camera is located at a second position, being different from said first position, and wherein said second camera is configured to record a second portion of the scene, being different from the first portion of the scene, to obtain a second recorded image of said camera pair. Moreover, the system comprises a central camera, being located at a central-camera position, wherein the central camera is configured to record a central-camera-recorded portion of the scene, to obtain a central image. Furthermore, the system comprises a processor for generating the output image. For each camera pair of the one or more camera pairs, the first camera of said camera pair is configured to record a first brightness range, being assigned to said first camera, when recording the first portion of the scene. The central camera is configured to record a central-camera brightness range when recording the central-camera-recorded portion of the scene. The first brightness range of the first camera of each camera pair of the one or more camera pairs is different from the central-camera brightness range of the central camera, and is different from the first brightness range of the first camera of any other camera pair of the one or more camera pairs. For each camera pair of the one or more camera pairs, the processor is configured to transform, depending on the second recorded image of said camera pair and depending on the central-camera position of the central camera, the first recorded image of said camera pair or a portion of the first recorded image of said camera pair, to obtain a first transformed image of said camera pair. Moreover, for each camera pair of the one or more camera pairs, the processor is configured to transform, depending on the first recorded image of said camera pair and depending on the central-camera position of the central camera, the second recorded image of said camera pair or a portion of the second recorded image of said camera pair, to obtain a second transformed image of said camera pair. The processor is configured to generate the output image by combining the central image and the first transformed image and the second transformed image of each of the one or more camera pairs.

According to another embodiment, a system for generating a first output image and a second output image is provided. The system comprises one or more camera pairs, wherein each camera pair of the one or more camera pairs comprises a first camera and a second camera, wherein said first camera is located at a first position, wherein said first camera is configured to record a first portion of a scene to obtain a first recorded image of said camera pair, wherein said second camera is located at a second position, being different from said first position, and wherein said second camera is configured to record a second portion of the scene, being different from the first portion of the scene, to obtain a second recorded image of said camera pair. Moreover, the system comprises a first central camera, being located at a first central-camera position, wherein the first central camera is configured to record a first central-camera-recorded portion of the scene, to obtain a first central image. Furthermore, the system comprises a second central camera, being located at a second central-camera position, wherein the second central camera is configured to record a second central-camera-recorded portion of the scene, to obtain a second central image. Moreover, the system comprises a processor for generating the first output image and for generating the second output image. For each camera pair of the one or more camera pairs, the first camera of said camera pair is configured to record a first brightness range, being assigned to said first camera, when recording the first portion of the scene. The first central camera is configured to record a first central-camera brightness range when recording the first central-camera-recorded portion of the scene. The second central camera is configured to record a second central-camera brightness range when recording the second central-camera-recorded portion of the scene. The first brightness range of the first camera of each camera pair of the one or more camera pairs is different from the first central-camera brightness range of the first central camera, is different from the second central-camera brightness range of the second central camera, and is different from the first brightness range of the first camera of any other camera pair of the one or more camera pairs. For each camera pair of the one or more camera pairs, the processor is configured to transform, depending on the second recorded image of said camera pair and depending on the first central-camera position of the first central camera, the first recorded image of said camera pair or a portion of the first recorded image of said camera pair, to obtain a first transformed image of said camera pair. Moreover, for each camera pair of the one or more camera pairs, the processor is configured to transform, depending on the first recorded image of said camera pair and depending on the first central-camera position of the first central camera, the second recorded image of said camera pair or a portion of the second recorded image of said camera pair, to obtain a second transformed image of said camera pair. The processor is configured to generate the first output image by combining the first central image and the first transformed image and the second transformed image of each of the one or more camera pairs. For each camera pair of the one or more camera pairs, the processor is configured to transform, depending on the second recorded image of said camera pair and depending on the second central-camera position of the second central camera, the first recorded image of said camera pair or a portion of the first recorded image of said camera pair, to obtain a third transformed image of said camera pair. Moreover, for each camera pair of the one or more camera pairs, the processor is configured to transform, depending on the first recorded image of said camera pair and depending on the second central-camera position of the second central camera, the second recorded image of said camera pair or a portion of the second recorded image of said camera pair, to obtain a fourth transformed image of said camera pair. The processor is configured to generate the second output image by combining the second central image and the third transformed image and the fourth transformed image of each of the one or more camera pairs.

In another embodiment, a system for generating an output image is provided. The system comprises one or more camera groups, wherein each camera group of the one or more camera groups comprises two or more cameras, wherein each camera of said two or more cameras is configured to record a portion of a scene to obtain a recorded image of said camera of said camera group, and wherein at least one of the one or more camera groups comprises three or more cameras. Moreover, the system comprises a central camera, being located at a central-camera position, wherein the central camera is configured to record a central-camera-recorded portion of the scene, to obtain a central image. Furthermore, the system comprises a processor for generating the output image. For each camera group of the one or more camera groups, each camera of said camera group records a brightness range, being assigned to said camera, when recording the portion of the scene. The central camera is configured to record a central-camera brightness range when recording the central-camera-recorded portion of the scene. The brightness range of each camera of each camera group of the one or more camera groups, is different from the central-camera brightness range of the central camera, and is different from the brightness range of each camera of any other camera group of the one or more camera groups. For each camera group of the one or more camera groups, the processor is configured to transform, depending on the recorded image of a second camera of said camera group and depending on the central-camera position of the central camera, the recorded image of a first camera of said camera group or a portion of the recorded image of said first camera of said camera group, to obtain a first transformed image of said camera group. Moreover, for each camera group of the one or more camera groups, the processor is configured to transform, depending on the recorded image of a first camera of said camera group and depending on the central-camera position of the central camera, the recorded image of a second camera of said camera group or a portion of the recorded image of said second camera of said camera group, to obtain a second transformed image of said camera group. The processor is configured to generate the output image by combining the central image and the first transformed image and the second transformed image of each of the one or more camera group.

According to another embodiment, a method for generating an output image is provided. The method comprises:

Recording, for each camera pair of one or more camera pairs, a first portion of a scene by a first camera of said camera pair, to obtain a first recorded image of said camera pair, wherein said first camera is located at a first position.

Recording, for each camera pair of the one or more camera pairs, a second portion of a scene by a second camera of said camera pair, to obtain a second recorded image of said camera pair, wherein said second camera is located at a second position, being different from the first position of the first camera of said camera pair.

Recording by a central camera a central-camera-recorded portion of the scene to obtain a central image, wherein the central camera is located at a central-camera position. And:

Generating the output image.

For each camera pair of the one or more camera pairs, recording the first portion of the scene by the first camera of said camera pair is conducted by recording a first brightness range, being assigned to said first camera, when recording the first portion of the scene. Recording the central-camera-recorded portion of the scene by the central camera is conducted by recording a central-camera brightness range when recording the central-camera-recorded portion of the scene. The first brightness range of the first camera of each camera pair of the one or more camera pairs is different from the central-camera brightness range of the central camera, and is different from the first brightness range of the first camera of any other camera pair of the one or more camera pairs. Generating the output image is conducted, for each camera pair of the one or more camera pairs, by transforming, depending on the second recorded image of said camera pair and depending on the central-camera position of the central camera, the first recorded image of said camera pair or a portion of the first recorded image of said camera pair, to obtain a first transformed image of said camera pair. Moreover, generating the output image is conducted, for each camera pair of the one or more camera pairs, by transforming, depending on the first recorded image of said camera pair and depending on the central-camera position of the central camera, the second recorded image of said camera pair or a portion of the second recorded image of said camera pair, to obtain a second transformed image of said camera pair. Generating the output image is conducted by combining the central image and the first transformed image and the second transformed image of each of the one or more camera pairs.

In another embodiment, a method for generating a first output image and a second output image is provided. The method comprises:

Recording, for each camera pair of one or more camera pairs, a first portion of a scene by a first camera of said camera pair, to obtain a first recorded image of said camera pair, wherein said first camera is located at a first position.

Recording, for each camera pair of the one or more camera pairs, a second portion of a scene by a second camera of said camera pair, to obtain a second recorded image of said camera pair, wherein said second camera is located at a second position, being different from the first position of the first camera of said camera pair.

Recording by a first central camera a first central-camera-recorded portion of the scene to obtain a first central image, wherein the first central camera is located at a first central-camera position.

Recording by a second central camera a second central-camera-recorded portion of the scene to obtain a second central image, wherein the second central camera is located at a second central-camera position.

Generating the first output image. And:

Generating the second output image.

For each camera pair of the one or more camera pairs, recording the first portion of the scene by the first camera of said camera pair is conducted by recording a first brightness range, being assigned to said first camera, when recording the first portion of the scene. Recording the first central-camera-recorded portion of the scene by the first central camera is conducted by recording a first central-camera brightness range when recording the first central-camera-recorded portion of the scene. Recording the second central-camera-recorded portion of the scene by the second central camera is conducted by recording a second central-camera brightness range when recording the second central-camera-recorded portion of the scene. The first brightness range of the first camera of each camera pair of the one or more camera pairs is different from the first central-camera brightness range of the first central camera, is different from the second central-camera brightness range of the second central camera, and is different from the first brightness range of the first camera of any other camera pair of the one or more camera pairs. Generating the first output image is conducted, for each camera pair of the one or more camera pairs, by transforming, depending on the second recorded image of said camera pair and depending on the first central-camera position of the first central camera, the first recorded image of said camera pair or a portion of the first recorded image of said camera pair, to obtain a first transformed image of said camera pair. Moreover, generating the first output image is conducted, for each camera pair of the one or more camera pairs, by transforming, depending on the first recorded image of said camera pair and depending on the first central-camera position of the first central camera, the second recorded image of said camera pair or a portion of the second recorded image of said camera pair, to obtain a second transformed image of said camera pair. Furthermore, generating the first output image is conducted by combining the first central image and the first transformed image and the second transformed image of each of the one or more camera pairs. Generating the second output image is conducted, for each camera pair of the one or more camera pairs, by transforming, depending on the second recorded image of said camera pair and depending on the second central-camera position of the second central camera, the first recorded image of said camera pair or a portion of the first recorded image of said camera pair, to obtain a third transformed image of said camera pair. Moreover, generating the second output image is conducted, for each camera pair of the one or more camera pairs, by transforming, depending on the first recorded image of said camera pair and depending on the second central-camera position of the second central camera, the second recorded image of said camera pair or a portion of the second recorded image of said camera pair, to obtain a fourth transformed image of said camera pair. Furthermore, generating the second output image is conducted by combining the second central image and the third transformed image and the fourth transformed image of each of the one or more camera pairs.

According to another embodiment, a method for generating an output image is provided. The method comprises:

Recording, by each camera of each camera group of two or more camera groups, a portion of a scene to obtain a recorded image of said camera of said camera group, wherein at least one of the one or more camera groups comprises three or more cameras.

Recording by a central camera a central-camera-recorded portion of the scene to obtain a central image, wherein the central camera is located at a central-camera position. And:

Generating the output image.

For each camera group of the one or more camera groups, recording the portion of the scene by each camera of said camera group is conducted by recording a brightness range, being assigned to said camera, when recording the portion of the scene. Recording the central-camera-recorded portion of the scene by the central camera is conducted by recording a central-camera brightness range when recording the central-camera-recorded portion of the scene. The brightness range of each camera of each camera group of the one or more camera groups, is different from the central-camera brightness range of the central camera, and is different from the brightness range of each camera of any other camera group of the one or more camera groups. Generating the output image is conducted, for each camera group of the one or more camera groups, by transforming, depending on the recorded image of a second camera of said camera group and depending on the central-camera position of the central camera, the recorded image of a first camera of said camera group or a portion of the recorded image of said first camera of said camera group, to obtain a first transformed image of said camera group. Moreover, generating the output image is conducted, for each camera group of the one or more camera groups, by transforming, depending on the recorded image of a first camera of said camera group and depending on the central-camera position of the central camera, the recorded image of a second camera of said camera group or a portion of the recorded image of said second camera of said camera group, to obtain a second transformed image of said camera group. Furthermore, generating the output image is conducted by combining the central image and the first transformed image and the second transformed image of each of the one or more camera group.

Moreover, computer programs for implementing one of the above-described methods when being executed on a computer or signal processor are provided.

Further embodiments will be provided in the dependent claims.

Before embodiments of the present invention are described in detail using the accompanying figures, it is to be pointed out that the same or functionally equal elements are given the same reference numbers in the figures and that a repeated description for elements provided with the same reference numbers is omitted. Hence, descriptions provided for elements having the same reference numbers are mutually exchangeable.

BRIEF DESCRIPTION OF THE DRAWINGS

FIG. 16a illustrates a unified image of two transformed satellite images, and FIG. 16b illustrates a difference image of the two transformed satellite images.

DETAILED DESCRIPTION OF THE INVENTION

Figure 1A:
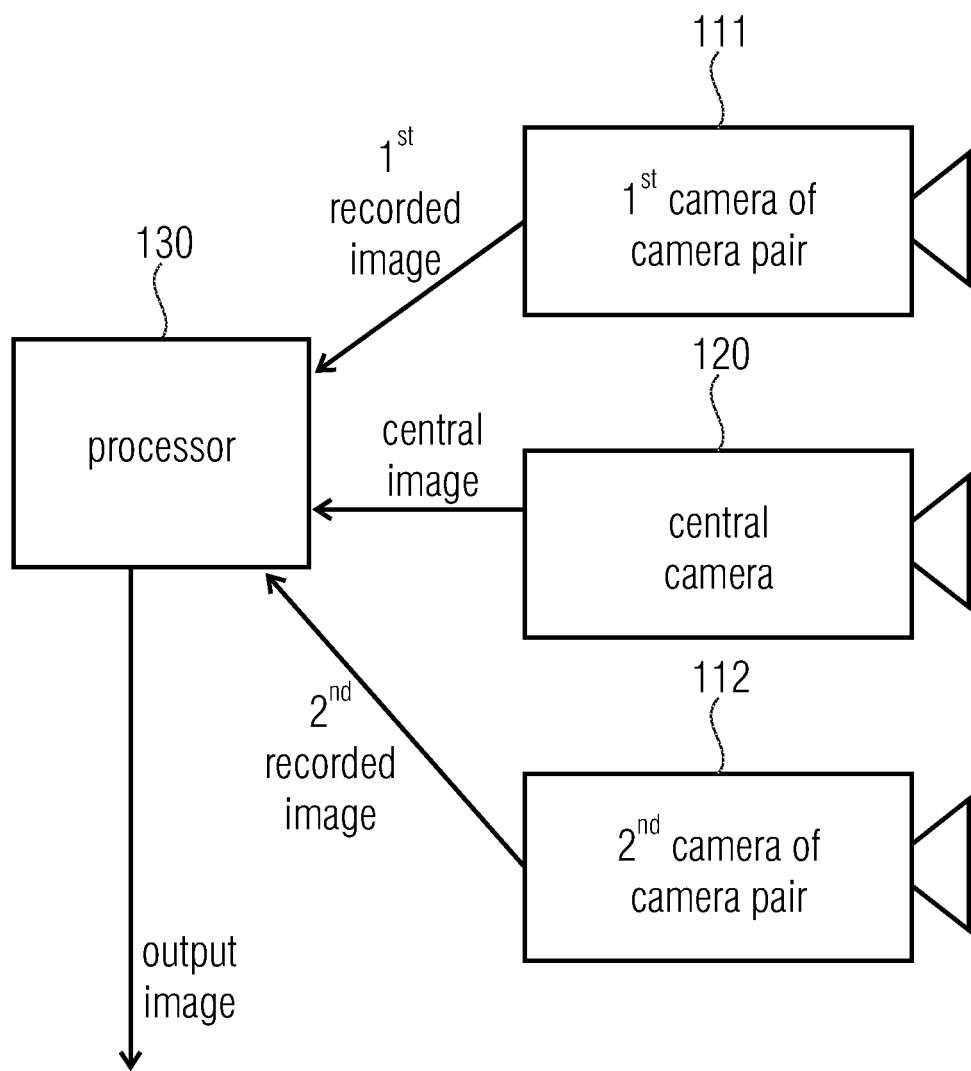
FIG. 1a illustrates a system for generating an output image according to an embodiment.

At first, some considerations for improving the understanding of the present invention are provided.

As explained above, frequently, regarding image and video recording, the dynamic range of cameras is not sufficient so as to be able to record a scene accurately. The consequence is underexposure of dark parts of an image and overexposure of bright parts of an image.

Several cameras for special demands, e.g., for recording particular brightness ranges of a scene, may be employed, to increase the dynamic range.

For example, each of the several cameras is responsible for a particular brightness range.

One camera, for example, covers a dark brightness range, and thus records dark areas of an image, a second camera records a medium brightness range, and thus records the medium brightness areas of the image, and a third camera records a bright brightness range, and thus records the bright areas of the image.

By this, portions of a first image recorded by a first camera, which are overexposed or underexposed, are correctly recorded by a second camera which records a different brightness range.

Different sensitivities of the different cameras; may, for example, be achieved by, using different ND filters (neutral density filters; ND=neutral density), by employing different exposure times or by digital simulation of different ND filters (different apertures might mean a change in depth of focus), or by a combination thereof.

An output image (the total image) may then be generated by merging the individual recordings to form a total image or total video at a high dynamic range.

However, when cameras are placed next to one another, these cameras do not see exactly the same section of an image. This means that images recorded by these cameras cannot be merged easily.

Different camera rigs may be employed which ensure by means of a mirror construction that all the cameras record the same sections of an image. However, this requires, as far as mechanics is concerned, a complicated alignment. When an increasing number of cameras are combined, such a solution becomes increasingly problematic or even impossible. Therefore, it is in general not useful to employ camera rigs with more than two cameras.

A different approach may be employed, wherein the cameras, may, e.g. be placed locally next to one another, e.g. on a line, for example, on a straight line, e.g. in a matrix. The recorded images are then adapted, such that they "fit one above the other". For adapting the images, image processing algorithms may be employed.

In particular, disparity differences may for example have to be compensated. Disparity differences result, when a camera is shifted by a certain distance, but the individual image objects of the image are not shifted by the same number of pixels.

For generating an output image from the different images recorded by different cameras at different positions, disparity information, e.g. one or more disparity maps, may be employed.

For example, a camera pair comprising two cameras, being located at different positions, may record a scene to obtain two recorded images. Both images may comprise a plurality of pixels, for example, the same number of pixels.

A disparity map may then be determined by analyzing both images. For example, the disparity map that is determined may indicate for each pixel of the first image, where the pixel that corresponds to said pixel of the first image is located in the second image.

E.g., if a pixel at position $(x, y)=(8, 5)$ in the first image is considered, and the corresponding pixel in the second image is located at position $(x, y)=(11, 5)$, then the disparity map may indicate, that said pixel of the first image has to be shifted by +3 to the right, to arrive at the position of the corresponding pixel in the second image.

While one disparity map may, for example, indicate, by how many pixel positions a pixel of the first image has to be shifted to arrive at the corresponding pixel in the second image, a second disparity map may, for example, indicate, by how many pixel positions a pixel of the second image has to be shifted to arrive at the corresponding pixel in the first image.

In preferred embodiments, the cameras may, for example, be vertically aligned, such that pixels of a first image only have to be shifted horizontally, but not vertically, to arrive at the positions of the corresponding pixels in a second image.

Image processing algorithms may, for example, be employed to determine the one or more disparity maps. For example, same objects in both images may be identified to determine the one or more disparity maps.

It should be noted that the disparity (the pixel offset) depends on how far away the object is from the camera. For example, the disparity of pixels, which display objects that are located close to the cameras, is greater than the disparity of pixels which display objects that are far away from the cameras. Thus the disparities for each of the pixels of the considered images may have to be individually determined. At least the disparities for pixels which relate to different objects in the scene that have different distances to the cameras have to be individually defined.

Therefore, in order to modify images from two or more cameras such that the images fit "one above the other", and thus bright and dark sub-images may be merged, the disparity for each object/pixel of the image may be established in order for the different image offsets to be corrected and in order for the images to fit together.

In embodiments, at first, the disparities may be determined and then, the disparities may be corrected. To determine disparities, departing from a starting image, it is determined for each pixel where the corresponding pixel is located in the other images.

For example, disparities are determined, e.g., by determining a cost term for all potential disparity values and selecting that disparity value of the least costs. The costs may in turn be estimated using image similarity. When one area in the starting image is very similar to an area in a second image, the probability that this is about the same section of a scene is very high. In this case, the costs for the disparity value established are very low.

Figure 7:
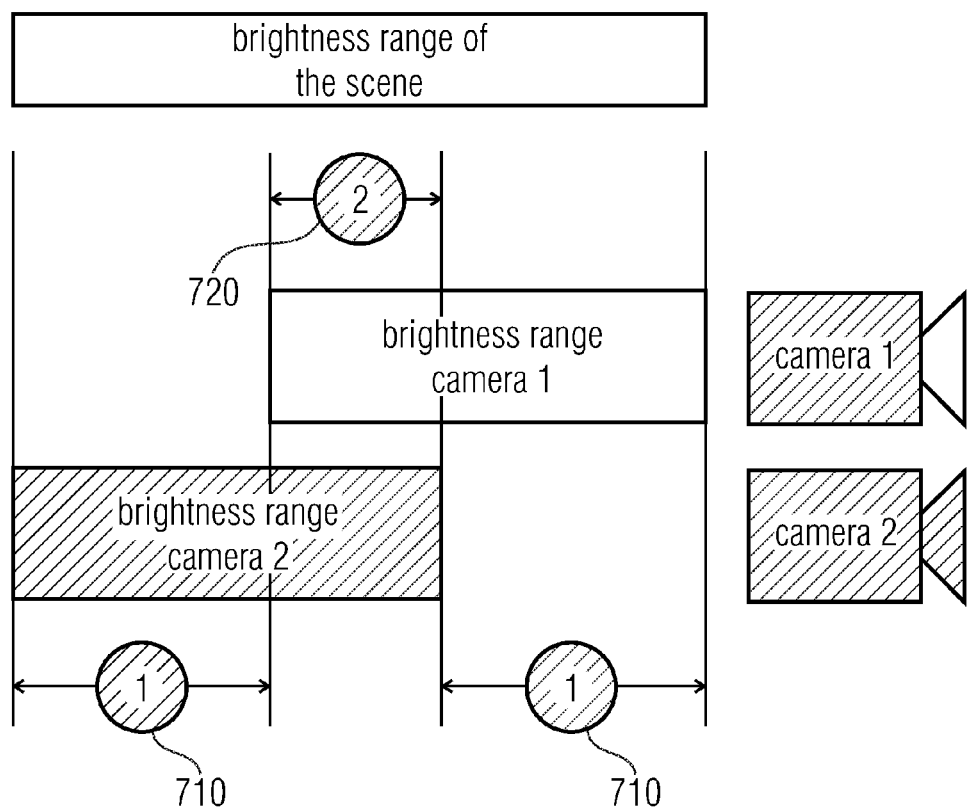
FIG. 7 illustrates a scenario, where two cameras record different brightness ranges when recording a scene.

However, as illustrated by FIG. 7, the cameras shall cover different brightness ranges and consequently, some objects visible in an image portion of a first image recorded by a first camera may not be visible in a corresponding image portion of a second image recorded by a second camera, because there, these objects may be underexposed or overexposed.

FIG. 7 illustrates such a scenario, where two cameras record different brightness ranges (brightness range camera 1 and brightness range camera 2) when recording a scene. For objects which belong to a brightness indicated by circle "2" 720, a reliable disparity estimation is possible. Objects which belong to a brightness indicated by one of the circles "1" 710, are, however, only visible by one of the cameras. Thus, a reliable disparity estimation and correction is not possible for those objects, which belong to a brightness indicated by one of the circles "1" 710.

For such corresponding image portions, the disparity of these portions such two images cannot be determined, because the object visible in the first image is not visible in the second one of the images. This means that the disparity values cannot be established and consequently cannot be corrected.

Merging different sub-images thus results in artifacts.

To provide high dynamic range images in a hardware and software efficient way, some of the provided embodiments apply the following concepts:

A central camera and one or more camera pairs comprising two cameras are employed.

The central camera records a (central-camera recorded) portion of a scene as a central image.

The two cameras of each of the one or more camera pairs record two further images. At least one of the two images of each of the one or more camera pairs is transformed, and the output image is generated depending on the central image and depending on the transformed image. For example, one of the camera pair images is transformed such that it fits above the central image recorded by the central camera, and the output image is generated depending on the central image and depending on the transformed image.

When the two cameras of one of the camera pairs record the same scene from their two different positions, then the positions of all objects that are visible in both two images can be estimated.

It is preferable, that both cameras of the camera pair record the same brightness range, when recording the scene. By this, all objects that are not underexposed and not overexposed in the image recorded by the first camera of the camera pair are also not underexposed and not overexposed in the image recorded by the second camera of the camera pair.

Figure 2A:
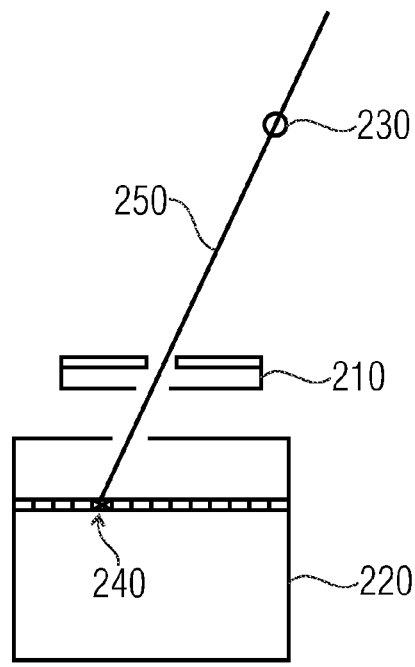
FIGS. 2a, 2b illustrate object position estimation with respect to a scene.

Position estimation of an object depending on two images can briefly be described with reference to FIG. 2*a*, assuming an ideal camera free of any distortions.

When the position of the first camera 210 that has recorded the first image 220 is known, then the fact that an object 230 is represented at a certain pixel position 240 of the recorded first image 220 defines that the object 230 is located on a straight line 250 starting from the first camera 210 and being defined by the position 240 of the pixel that represents the object 230 in the first image 220. What is not known, however, is the distance of the object 230 from the first camera 210.

However, when the scene is recorded by a second camera from a different position (e.g., by a second camera of the camera pair), a disparity map can be determined, and such a disparity map indicates the distance of the recorded objects. For example, pixels representing objects that are close to the recording cameras have greater disparity values than pixels representing objects that are far away from the cameras. When the positions of both cameras are known, then (e.g., by further employing information on the camera orientations, the properties of the cameras and the chosen settings of the cameras) the distance of the object from the first camera can be exactly defined.

Figure 2B:
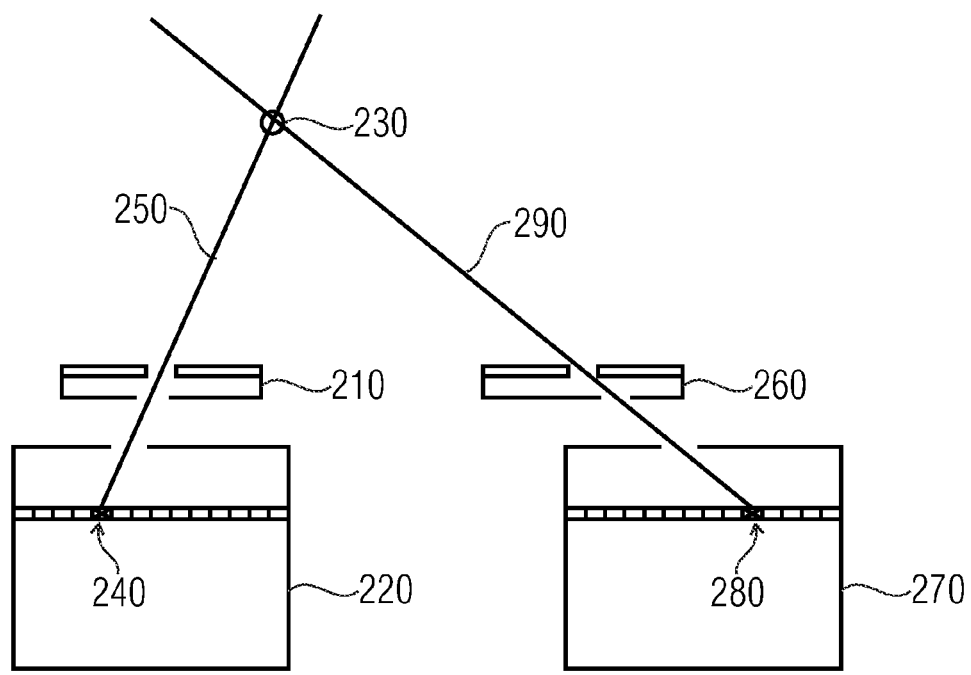

Put it in other words with reference to FIG. 2*b*: When a second camera 260 records a second image 270 of the same scene, then the fact that the object 230 is represented at a certain pixel position 280 of the recorded second image 270 defines that the object 230 is located on a straight line 290 starting from the second camera 260 and being defined by the position 280 of the pixel that represents the object 230 in the second image 270. What from the second image 270 alone is not known, however, is the distance of the object 230 from the second camera 260.

However, as the first camera 210 and the second camera 260 are located at different positions, the straight line 250 starting from the first camera 210 and the straight line 290 starting from the second camera 260 intersect at the location of the object 230 in the scene, and thus, the location of the object 230 can be determined.

Or, explained with respect to the disparity map: Information on a pixel position 280 representing the object 230 in the second image 270 can be derived from the disparity map and from the information on a corresponding pixel position 240 representing the object 230 in the first image 220, because the disparity map provides information by how many pixels the pixel representing the object 230 in the first image 220 has to be shifted to arrive at the pixel position 280 of the corresponding pixel in the second image 270. E.g., by using the positions of the cameras 210, 260, then the two straight lines 250, 290 from the first camera 210 and second camera 260 pointing to the object 230, respectively, can be derived and thus, the intersection of the straight lines 250, 290 defines the position of the object 230 in the scene.

The position of the object 230 in the scene can also be calculated directly from the disparity map, from the position 240 of the pixel representing the object 230 in the first image 220, e.g. by using information of the positions of the two cameras 210, 260 recording the images 220, 270.

Figure 2C:
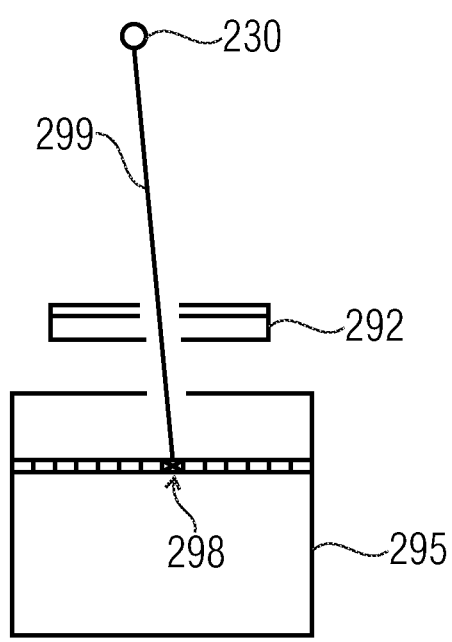
FIG. 2c illustrates object position estimation with respect to a recorded image.

Moreover, explained with respect to FIG. 2c, assuming that the object 230 is not visible in a central image 295 recorded by a central camera 292, because the object is overexposed or underexposed in the central image: If the position of the object 230 is known in the scene (e.g., the position may be derived based on the concepts described above) then the position 298 of the pixel that would represent the object 230 in the central image 295, if the object 230 would be visible in the central image 295, can be calculated based on the position of the central camera 292 and based on the position of the object 230 in the scene. For example, a straight line 299 from the position of the object 230 in the scene to the central camera 292 may be determined to determine the position 298 of the pixel that would represent the object 230 in the central image 295.

It should be noted, that the straight line 299 itself does not have to be calculated, and also the position of the object 230 in the scene itself does not have to be calculated, but instead, the pixel position 298 that would represent the object 230 in the central image 295 can be directly calculated based on the first image 220 and based on the disparity map, e.g. by employing information on the position of the first camera 210, by employing information on the position of the second camera 260 and by employing information on the position of the central camera 295.

FIG. 1a illustrates a system for generating an output image according to an embodiment.

The system comprises one or more camera pairs, wherein each camera pair of the one or more camera pairs comprises a first camera 111 and a second camera 112.

The first camera 111 is located at a first position. The first camera 111 is configured to record a first portion of a scene to obtain a first recorded image of said camera pair.

The second camera 112 is located at a second position, being different from said first position. The second camera 112 is configured to record a second portion of the scene, being different from the first portion of the scene, to obtain a second recorded image of said camera pair.

Moreover, the system comprises a central camera 120, being located at a central-camera position. The central camera 120 is configured to record a central-camera-recorded portion of the scene, to obtain a central image.

Furthermore, the system comprises a processor 130 for generating the output image. For each camera pair of the one or more camera pairs, the processor 130 is configured to transform, depending on the second recorded image of said camera pair and depending on the central-camera position of the central camera 120, the first recorded image of said camera pair or a portion of the first recorded image of said camera pair, to obtain a first transformed image of said camera pair.

Accordingly, for each camera pair of the one or more camera pairs, the processor 130 is configured to transform, depending on the first recorded image of said camera pair and depending on the central-camera position of the central camera 120, the second recorded image of said camera pair or a portion of the second recorded image of said camera pair, to obtain a second transformed image of said camera pair.

Moreover, the processor 130 is configured to combine the central image and the first and the second transformed image of each camera pair of the one or more camera pairs to generate the output image.

For example, the processor 130 may transform each pixel of the first recorded image, and by this the whole first recorded image is transformed. Or, the processor 130 may transform only some of the pixels of the first recorded image and by this, only a portion of the first recorded image is transformed.

According to an embodiment, the central camera 120 is configured to record a central-camera brightness range when recording the central-camera-recorded portion of the scene.

For each camera pair of the one or more camera pairs, the first camera 111 of said camera pair is configured to record a first brightness range, being assigned to said first camera 111, when recording the first portion of the scene.

The first brightness range of the first camera 111 of each camera pair of the one or more camera pairs is different from the central-camera brightness range of the central camera 120. Moreover, the second brightness range of the second camera 112 of each camera pair of the one or more camera pairs is also different from the central-camera brightness range of the central camera.

In an embodiment, for each camera pair of the one or more camera pairs, the first camera 111 of said camera pair may, for example, be configured to record the first brightness range, being assigned to said first camera 111, when recording the first portion of the scene, and the second camera 112 of said camera pair may be configured to record a second brightness range, being assigned to said second camera 112, when recording the second portion of the scene, wherein said second brightness range of said second camera is equal to said first brightness range of said first camera 111.

Moreover, for example, the first brightness range of the first camera 111 of each camera pair of the camera pairs, being equal to the second brightness range of the second camera 112 of said camera pair, may be different from the central-camera brightness range of the central camera. If more than two camera pairs exist, the first brightness range of the first camera 111 of each camera pair of the camera pairs may also be different from the first brightness range of the first camera 111 of any other camera pair of the one or more camera pairs.

This configuration of the system is based on the finding that when each camera has a different brightness range in which it is able to record image information, disparity estimation cannot be done reliably. By always providing two cameras with the same brightness range, objects will always at least be visible by two cameras. Thus, the disparity may be estimated reliably. E.g., employing a rectified camera system, when the disparity is known, it is also possible to determine where the object is located. It is also possible to predict where the object would be seen from a third camera position. By this, images recorded by cameras at different locations can be merged.

Selecting one camera as a central camera serving as a reference, all the images may be transformed to the central camera perspective of the central camera. Objects which are imaged correctly in the central camera perspective may not be transformed, e.g., shifted. Consequently, these objects do not require disparity values. Thus, a camera that corresponds to the central camera as a further camera of a "central camera pair" is not necessary.

Some embodiments provide a system comprising a central camera of a certain brightness range, and logic pairs of cameras, wherein each pair of cameras covers a different brightness range, but the cameras of a logic pair (a camera pair) cover an identical brightness range. Cameras of a logic pair need not necessarily be located next to each other locally. The overlap of the brightness ranges between the pairs of cameras among one another and between the pairs of cameras and the central camera may be very small since disparities must only be estimated within a pair of cameras.

According to an embodiment, the processor 130 transforms the first recorded image, e.g., by shifting some or all pixels of the first recorded image, such that, after transformation, the first image "fits over" the central image.

For example, for each camera pair of the one or more camera pairs, the processor 130 may be configured determine disparity information depending on the first image of said camera pair and depending on the second image of said camera pair. Then, the processor 130 may be configured to transform, depending on said disparity information, the first recorded image of said camera pair or a portion of the first recorded camera pair, to generate the output image. According to a particular embodiment, for each camera pair of the one or more camera pairs, the processor 130 may be configured determine a disparity map as the disparity information, depending on the first image of said camera pair and depending on the second image of said camera pair.

Transformation of the first recorded image may, for example be conducted by the processor 130 based on the concepts described above: For example, based on the first recorded image and based on the second recorded image, disparity information, e.g., information on the disparity of the pixels of the first recorded image with respect to the second recorded image, or vice versa, may, for example, be generated by the processor 130, e.g., by generating one or more disparity maps. For example, transformation of the first recorded image may be conducted by the processor 130 by shifting one or more pixels of the first recorded image depending on said disparity map, to generate the output image.

Based on said disparity information, e.g., as described above, it can be determined whether objects recorded by the first camera 111, as well as the second camera 112 are close to the first and second camera 111, 112, or are far away from the first and the second recorded camera, 111, 112. E.g., by employing information on the position of the first camera 111 and on the position of the second camera 112, the exact location of each recorded object in the scene may be determined by the processor 130.

Then, e.g., by employing information on the position of the central camera 120, the pixel positions in the central image that would represent the objects of the first recorded image recorded by the first camera 111, may be determined by the processor 130, and the processor 130 may transform the first recorded image by shifting the pixels of the first recorded image to the pixel positions of the central image that correspond to the respective pixels of the first recorded image.

After the first recorded image has been transformed, the central image and the first recorded image are used by the processor 130 to generate the output image. For example, pixels of the first recorded image that have been transformed, which represent an object that is not visible in the central image, for example, because the corresponding pixels of the central image are overexposed or underexposed, may be used by the processor 130 to replace the overexposed or underexposed pixels of the central image in the output image.

According to a particular embodiment, for each camera pair of the one or more camera pairs, the processor 130 may be configured to determine a first disparity map and a second disparity map as the disparity information, depending on the first image of said camera pair and depending on the second image of said camera pair. For each camera pair of the one or more camera pairs, the processor 130 may be configured to transform, depending on said first disparity map, the first recorded image of said camera pair or a portion of the first recorded image of said camera pair, by shifting one or more pixels of the first recorded image depending on said first disparity map. Moreover, for each camera pair of the one or more camera pairs, the processor 130 may be configured to transform, depending on said second disparity map, the second recorded image of said camera pair or a portion of the second recorded image of said camera pair, by shifting one or more pixels of the second recorded image depending on said second disparity map.

For example, a first pixel of the first recorded image after transformation and a second pixel of the second recorded image after transformation, that both relate to the same pixel position in the central image may be used to generate the corresponding pixel in the output image, e.g. by generating a mean value of the first pixel and the second pixel.

Or, in an embodiment, said first disparity map and said second disparity map may be used to detect a transformation error. For example, when the first disparity map indicates that a first pixel at pixel position (5,12) in the first recorded image corresponds to a second pixel at pixel position (8,12) in the second recorded image, but when the second disparity map indicates that the second pixel at pixel position (8,12) in the second recorded image does not correspond to the first pixel at pixel position (5,12) in the first recorded image, but instead to a third pixel, e.g., at pixel position (2,12) in the first recorded image, this may indicate a transformation error. For example, the processor 130 may for example, be configured to conduct measurements responsive to the detection of a transformation error. Such measurements may, for example, be: generating by the processor 130 a third disparity map depending on the first and the second disparity map, e.g., by averaging the disparity values of the first and the second disparity map.

In another embodiment, the processor 130 is configured to compare the first transformed image and the second transformed image of each camera pair of the one or more camera pair to detect a transformation error.

Errors can be detected which can occur when satellite images are transformed into the central (camera) perspective. By using two satellite cameras, large redundant image areas are obtained after transformation into the central perspective. These image areas, however, are only redundant, if the disparity map, on which they are based do not comprise errors. Is this not the case (one or more errors exist), then difference generation allows detecting a deviation, Thus, possible transformation errors may be detected. These areas may later be used for postprocessing the disparity map or alternatively, may be used for image manipulation techniques, such as for a local filtering using a soft focus filter.

FIG. 16*b* illustrates the difference image of both transformed satellite images compared to the unified image illustrated by FIG. 16*a*. In particular at the edges and in areas comprising writing, differences can be detected, which can also be found in the image. At these positions, the differences can be correctly be classified as errors. However, there are also erroneous areas which cannot be detected using this method, for example, at the right edge of the adhesive film unwinder. It is to be estimated, to what extend this may be used for postprocessing.

According to a particular embodiment, the first recorded image of each camera pair of the one or more camera pairs comprises a plurality of pixels, the second recorded image of each camera pair of the one or more camera pairs comprises a plurality of pixels, and the central image comprises a plurality of pixels. The processor 130 may be configured to determine for each pixel of the plurality of pixels of the central image, whether said pixel is overexposed or underexposed, and, depending on whether said pixel of the central image is overexposed or underexposed, the processor 130 is configured to transform one or more pixels of the plurality of pixels of the first recorded image or of the second recorded image of at least one of the one or more camera pairs, to generate the output image.

On the other hand, it may also be useful to determine, whether a pixel of the first recorded image or the second recorded image of one of the camera pairs is overexposed or underexposed. Such pixel should, in some embodiment, possibly not be used for generating the output image. In such embodiments, the processor 130 may be configured to determine for each pixel of the plurality of pixels of the first recorded image of at least one of the one or more camera pairs, whether said pixel is not overexposed and not underexposed, and, depending on whether said pixel is not overexposed and not underexposed, the processor 130 may be configured to transform said pixel, to generate the output image.

Figure 8:
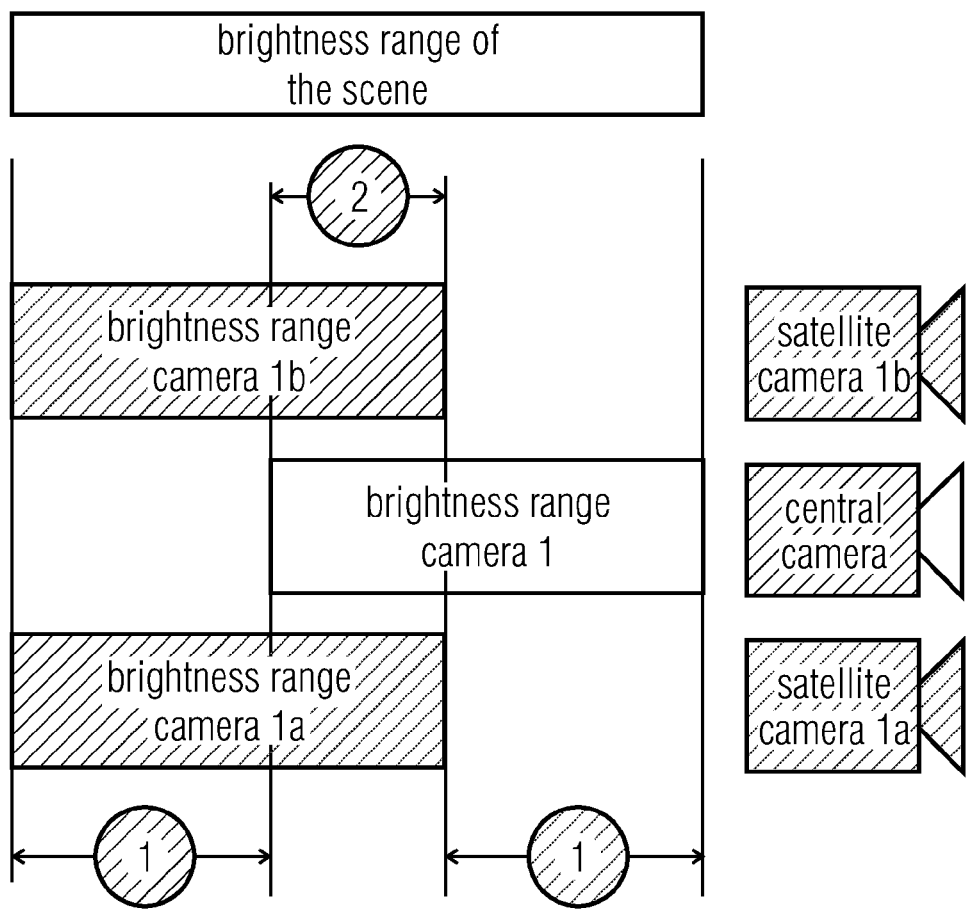
FIG. 8 illustrates an arrangement of a system according to an embodiment comprising three cameras.

FIG. 8 illustrates an arrangement of a system according to an embodiment comprising three cameras.

According to an embodiment, e.g., by using an algorithm, the processor 130 establishes for each pixel of the central camera, whether the pixel of a central image recorded by the central camera is overexposed or underexposed. If this is the case, a search is performed among the satellite cameras as to whether and where the corresponding information, e.g. a corresponding pixel, is available. If present, such corresponding information, e.g., said corresponding pixel, will be introduced in the central camera image (which represents the scene from the central camera perspective) at the corresponding position.

According to an embodiment, the system comprises at least two camera pairs as the one or more camera pairs.

Figure 1B:
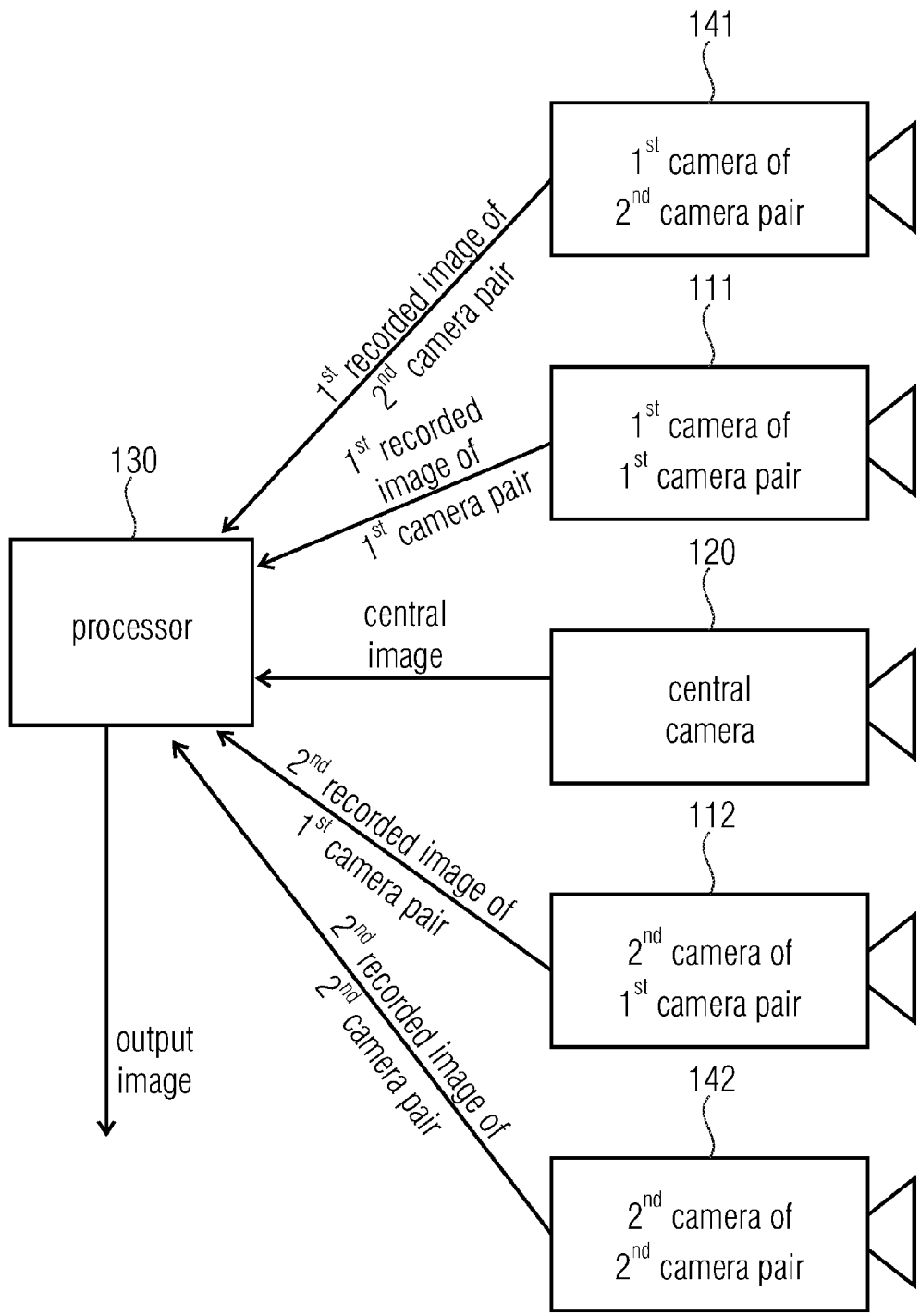
FIG. 1b illustrates a system for generating an output image according to another embodiment.

In FIG. 1b a system according to an embodiment is illustrated. As in FIG. 1a, the system comprises a central camera 120 and a processor 130 and a first camera pair comprising a first camera 111 of the first camera pair and a second camera 112 of the first camera pair. Moreover, the system illustrated by FIG. 1b comprises a second camera pair, wherein the second camera pair comprises a first camera 141 of the second camera pair and a second camera 142 of the second camera pair.

According to a particular embodiment, each of the cameras records a certain brightness range, when recording a scene. The brightness range of the first camera 111 of the first camera pair is equal to the brightness range of the second camera 112 of the first camera pair. The brightness range of the first camera 141 of the second camera pair is equal to the second brightness range of the second camera 142 of the second camera pair. However, the brightness range of the first camera 111 (and of the second camera 112) of the first camera pair is different from the brightness range of the first camera 141 (and of the second camera 142) of the second camera pair. Thus, the different camera pairs are each responsible for recording their own particular brightness range.

Figure 9:
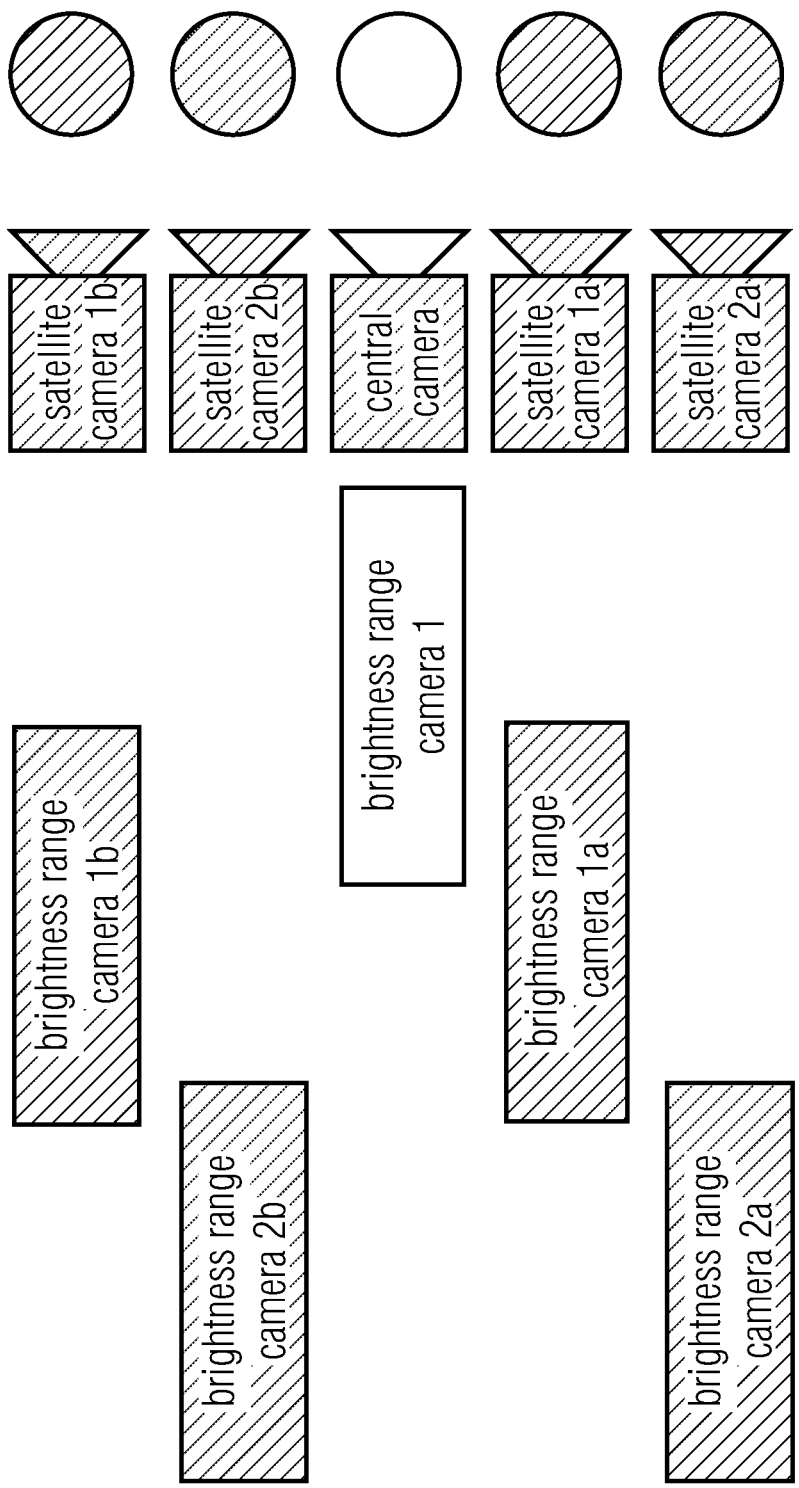
FIG. 9 illustrates a one-dimensional arrangement of a system according to an embodiment comprising a five camera array.

FIG. 9 illustrates a one-dimensional arrangement of a system according to an embodiment comprising a five camera array.

Figure 10:
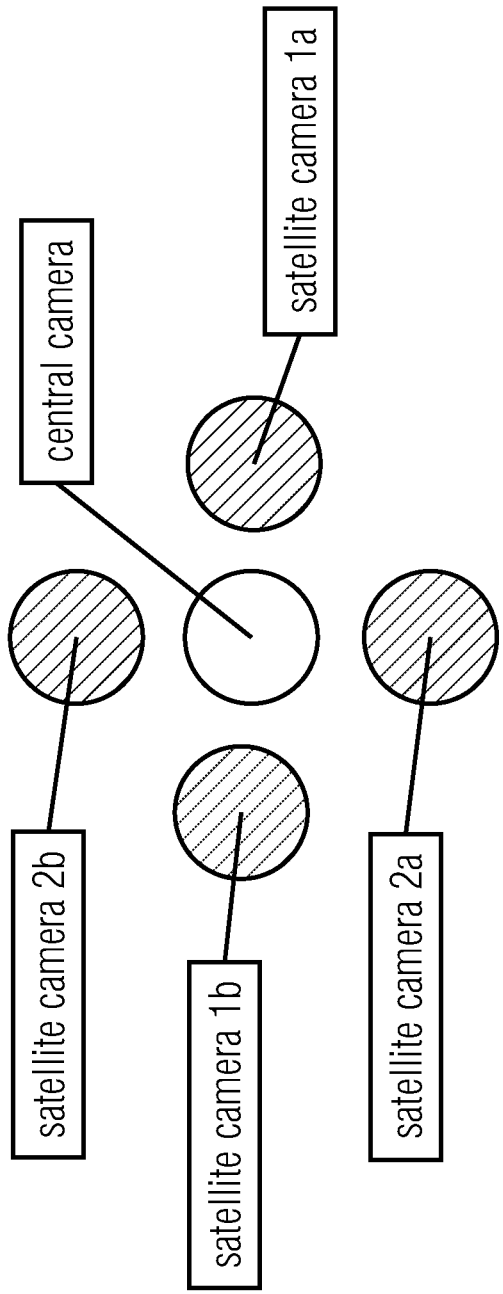
FIG. 10 illustrates a system according to an embodiment, illustrating a two-dimensional arrangement of a five camera array.

Moreover, FIG. 10 illustrates a system according to an embodiment, illustrating a two-dimensional arrangement of a five camera array.

Some embodiments provide concepts for solving masking problems.

Correcting disparities as described before aims at deforming the image of a satellite camera as if it were recorded from the perspective of the central camera.

Problems may arise since there are portions of an image which are seen by the central camera, but not by one or several satellite cameras.

Masking problems cannot be avoided completely; however by using a number of satellite cameras, the probability that a place of an image is not seen by any satellite camera is reduced.

Figure 11:
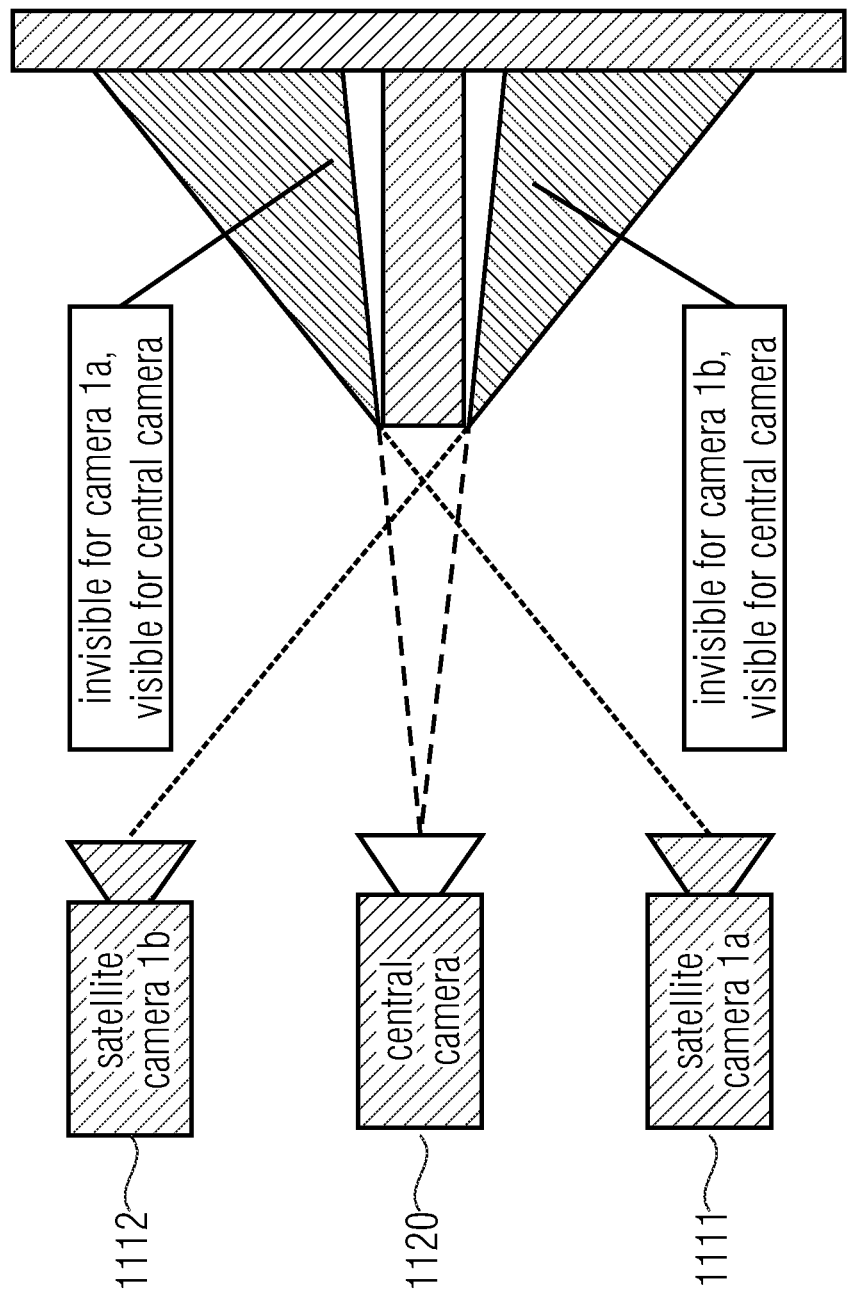
FIG. 11 illustrates a masking problem.

FIG. 11 illustrates the masking problem. The two satellite cameras 1111, 1112 together even see more of the scene than the central camera 1120 itself. It must, however, be kept in mind that it is easily possible to build a scene in which the central camera 1120 sees things which cannot be seen by any other satellite camera 1111, 1112. This means that there must be a right satellite camera 1111 and a left satellite camera 1112 for every target perspective.

Therefore, according to some embodiments, for each camera pair of the one or more camera pairs, the first camera of the camera pair and the second camera of the camera pair are arranged such that the central camera is located between the first and the second camera of the camera pair.

Or, defined more formally: For each camera pair of the one or more camera pairs, the first camera of said camera pair is located at the first position and the second camera of said camera pair is located at the second position, such that a first distance between the first position of said first camera and the (central-camera) position of the central camera is smaller than a second distance between the first position of said first camera and the second position of said second camera, and such that a third distance between the second position of said second camera and the central-camera position of the central camera is smaller than the second distance between the first position of said first camera and the second position of said second camera.

Figure 3A:
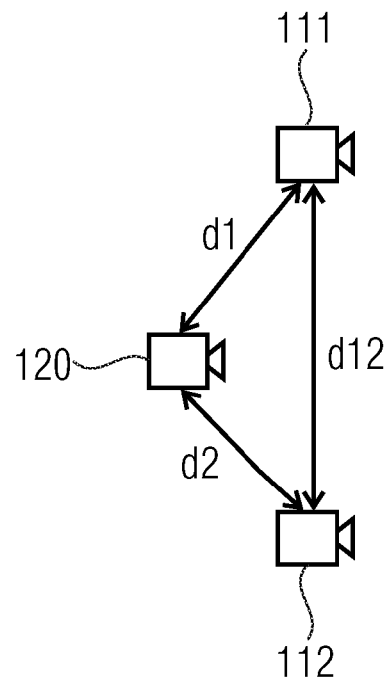
FIGS. 3a, 3b illustrate arrangements of cameras of systems according to embodiments.

FIG. 3a illustrates such an arrangement, illustrating a first camera 111 of a camera pair, a second camera 112 of the camera pair and a central camera 120. The distance d1 between (the position of) the first camera 111 and (the position of) the central camera 120 is smaller than the distance d12 between the first camera 111 and the second camera 112. Moreover, the distance d2 between (the position of) the second camera 111 and (the position of) the central camera 120 is smaller than the distance d12 between the first camera 111 and the second camera 112.

According to an embodiment, the first camera of each camera pair of the one or more camera pairs, the second camera of each camera pair of the one or more camera pairs, and the central camera are arranged such that a straight line exists such that the first camera of each camera pair of the one or more camera pairs, the second camera of each camera pair of the one or more camera pairs, and the central camera lie on said straight line.

Figure 3B:
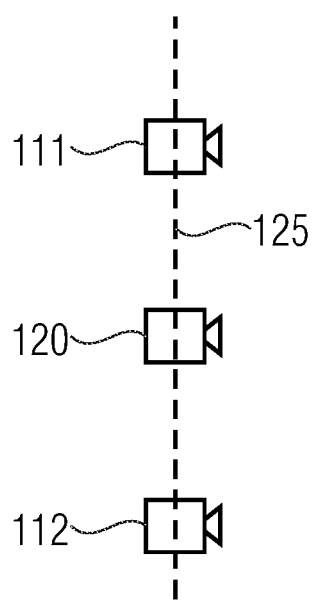

FIG. 3b illustrates an embodiment, where the first camera 111 of a camera pair, the second camera 112 of the camera pair, and the central camera 120 are arranged such that a straight line exists such that the first camera 111, the second camera 112 and the central camera 120 lie on a straight line 125 (indicated by a dashed line).

In some embodiments, it is desired that a single output image is generated, e.g., an individual image or a 2D video being generated by a camera array. In such a case, it is possible to use an individual camera as the central camera and thus the save one camera, as this central camera does not need a further camera as a second camera of a "central camera pair", because no disparity information is needed regarding the central camera.

In the following, embodiments are provided which output several images, such as, for example, stereo images, etc.

Outputting several images may, e.g., be useful for generating 3D images or videos.

Figure 4:
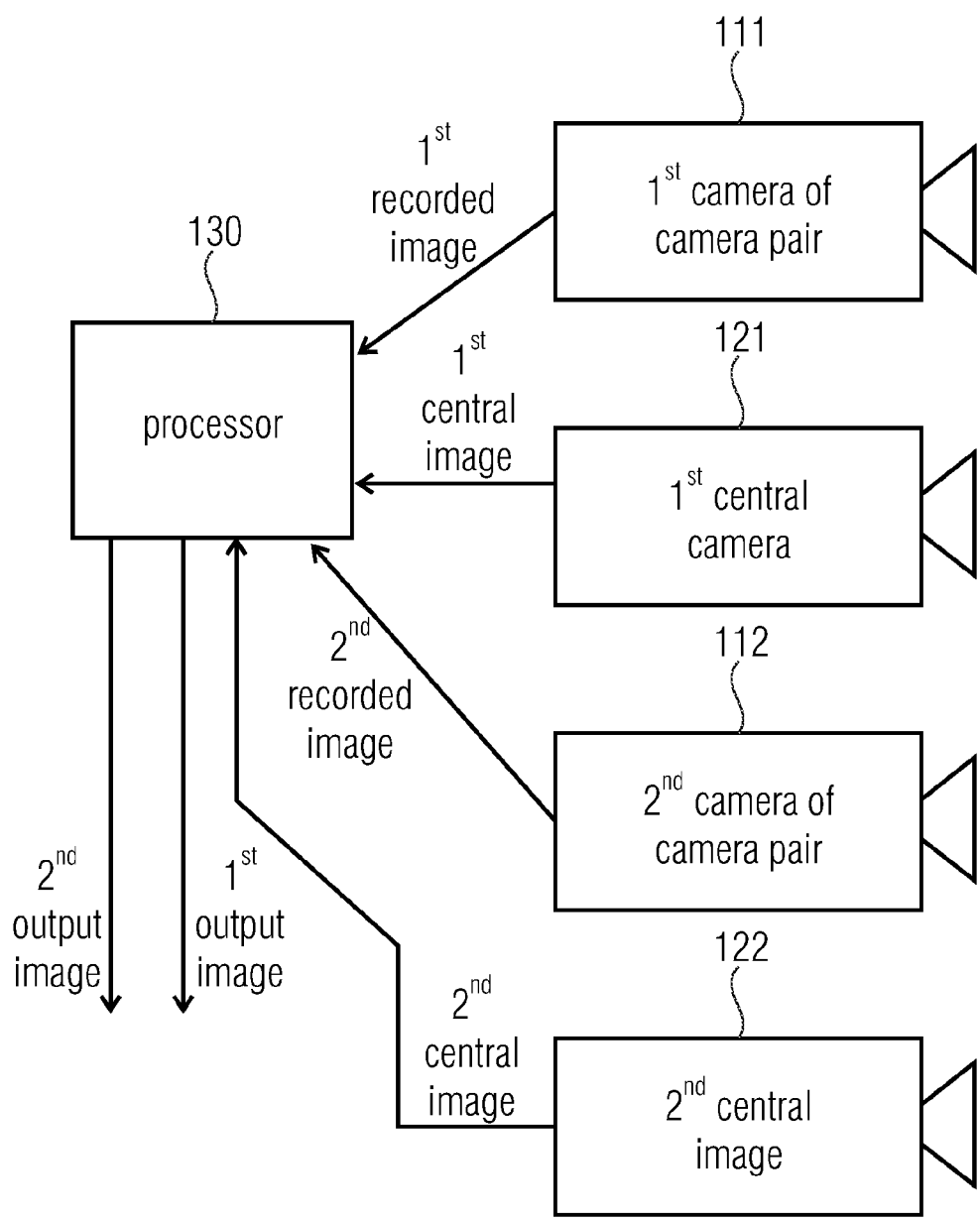
FIG. 4 illustrates a system for generating a first output image and a second output image according to an embodiment.

FIG. 4 illustrates such a system for generating a first output image and a second output image according to an embodiment.

The system of FIG. 4 comprises a camera pair, wherein each camera comprising a first camera 111 and a second camera 112, Said first camera 111 is located at a first position and is configured to record a first portion of a scene to obtain a first recorded image of said camera pair. Said second camera 112 is located at a second position, being different from said first position, and is configured to record a second portion of the scene, being different from the first portion of the scene, to obtain a second recorded image of said camera pair.

Moreover, the system comprises a first central camera 121, being located at a first central-camera position, and being configured to record a first central-camera-recorded portion of the scene, to obtain a first central image.

Furthermore, the system comprises a second central camera 122, being located at a second central-camera position, and being configured to record a second central-camera-recorded portion of the scene, to obtain a second central image.

Moreover, the system comprises a processor 130, being configured to generate the first output image and being configured to generate the second output image.

The first camera 111 of the camera pair is configured to record a first brightness range, being assigned to said first camera 111, when recording the first portion of the scene.

The first central camera 121 is configured to record a first central-camera brightness range when recording the first central-camera-recorded portion of the scene. The second central camera 122 is configured to record a second central-camera brightness range when recording the second central-camera-recorded portion of the scene, The first brightness range of the first camera 111 of the camera pair is different from the first central-camera brightness range of the first central camera 121 and is different from the second central-camera brightness range of the second central camera 112. In embodiments, where more than one camera pair exists, the first brightness range of the first camera 111 of the first camera pair is also different from the first brightness range of the first camera of any other camera pair of the camera pairs.

The processor 130 is configured to transform, depending on the second recorded image of said camera pair and depending on the first central-camera position of the first central camera 121, the first recorded image of said camera pair or a portion of the first recorded image of said camera pair, to obtain a first transformed image of said camera pair. Moreover, the processor 130 is configured to transform, depending on the first recorded image of said camera pair and depending on the first central-camera position of the first central camera 121, the second recorded image of said camera pair or a portion of the second recorded image of said camera pair, to obtain a second transformed image of said camera pair.

Furthermore, the processor 130 is configured to generate the first output image by combining the first central image and the first transformed image and the second transformed image of each of the one or more camera pairs.

Moreover, the processor 130 is configured to transform, depending on the second recorded image of said camera pair and depending on the second central-camera position of the second central camera 122, the first recorded image of said camera pair or a portion of the first recorded image of said camera pair, to obtain a third transformed image of said camera pair. Furthermore, the processor 130 is configured to transform, depending on the first recorded image of said camera pair and depending on the second central-camera position of the second central camera 122, the second recorded image of said camera pair or a portion of the second recorded image of said camera pair, to obtain a fourth transformed image of said camera pair.

Moreover, the processor 130 is configured to generate the second output image by combining the second central image and the third transformed image and the fourth transformed image of each of the one or more camera pairs.

When two perspectives are to be output, two central cameras are required.

Figure 12:
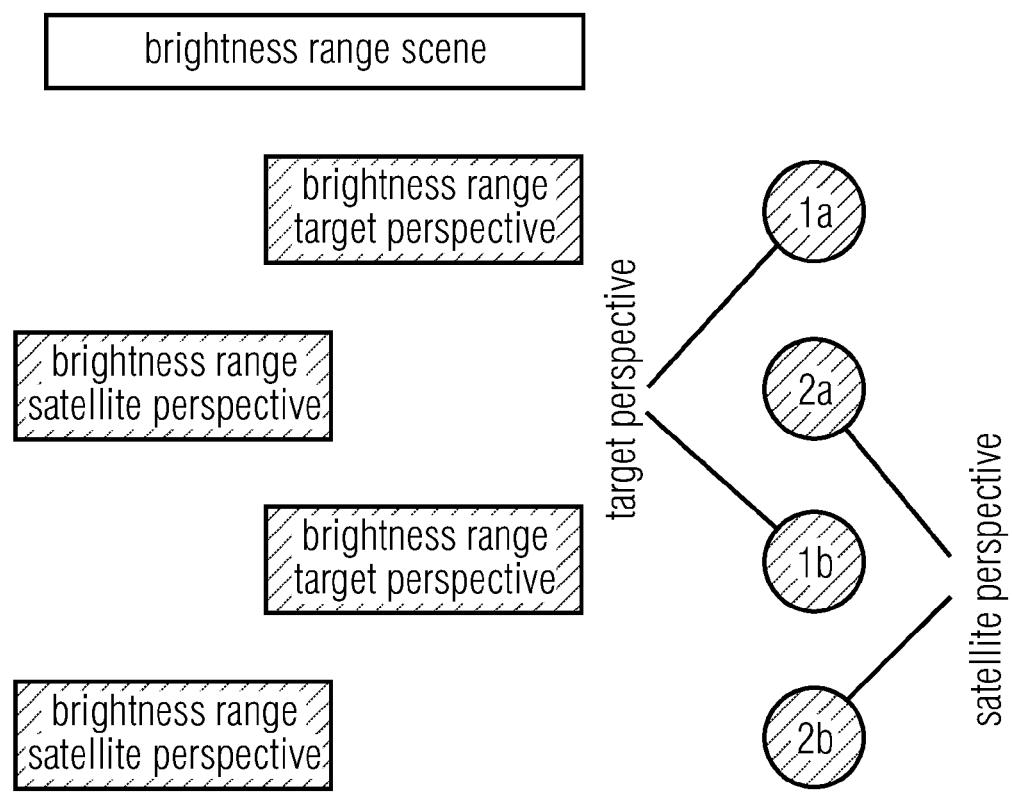
FIG. 12 illustrates brightness ranges of a system according to an embodiment for generating a first output image and a second output image.

FIG. 12 illustrates brightness ranges of a system according to an embodiment for generating a first output image and a second output image.

The problem illustrated by FIG. 12, however, is that the image from camera 2a may be impossible to be transferred completely to the perspective of camera 1a, since camera 2a does not see all the elements of the scene. This means that installing an additional camera is also of advantage here. This also means that one camera more is needed for the satellite perspective than for the target perspective.

Figure 13:
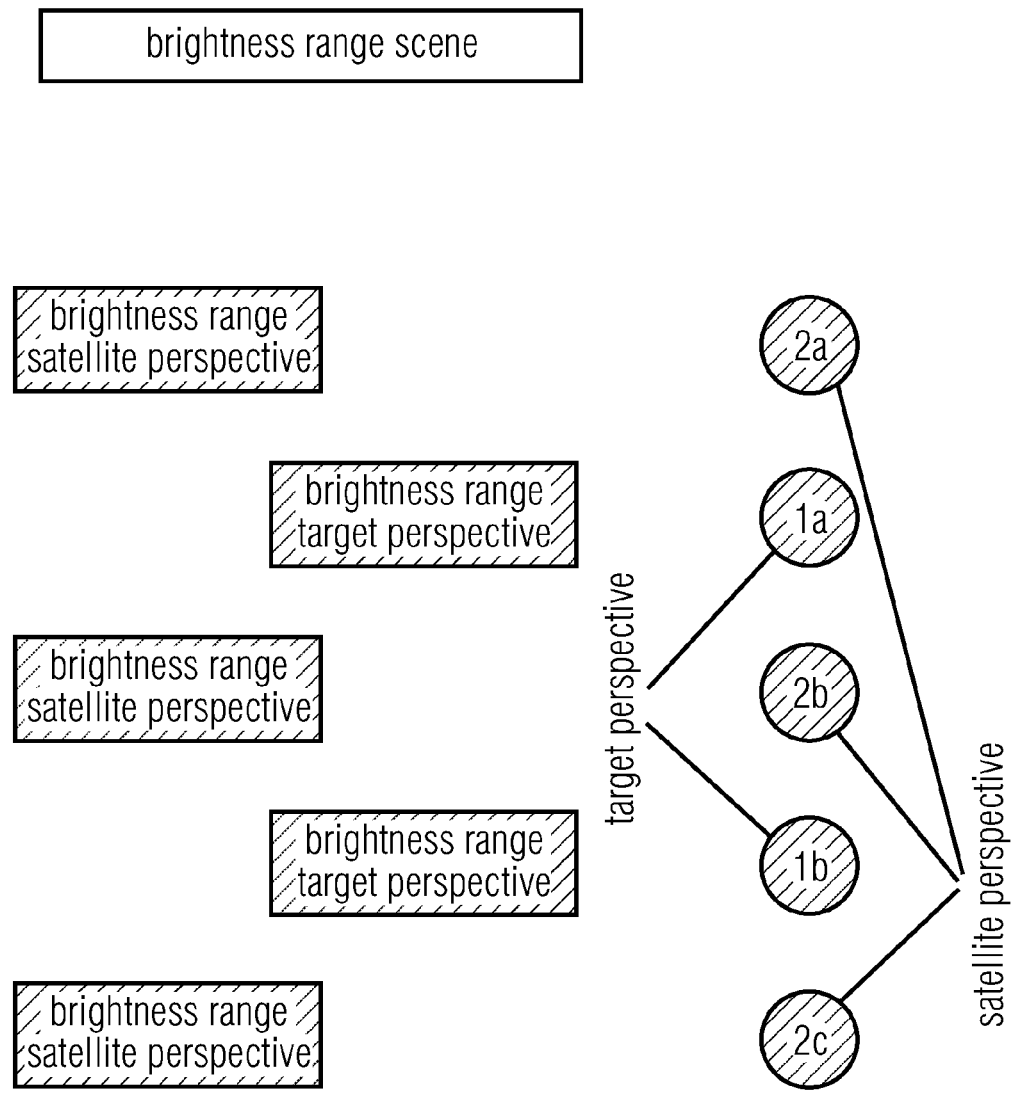
FIG. 13 illustrates brightness ranges of a system according to another embodiment for generating an improved output of two target perspectives.

FIG. 13 illustrates brightness ranges of a system according to another embodiment for generating an improved output of two target perspectives.

Figure 14:
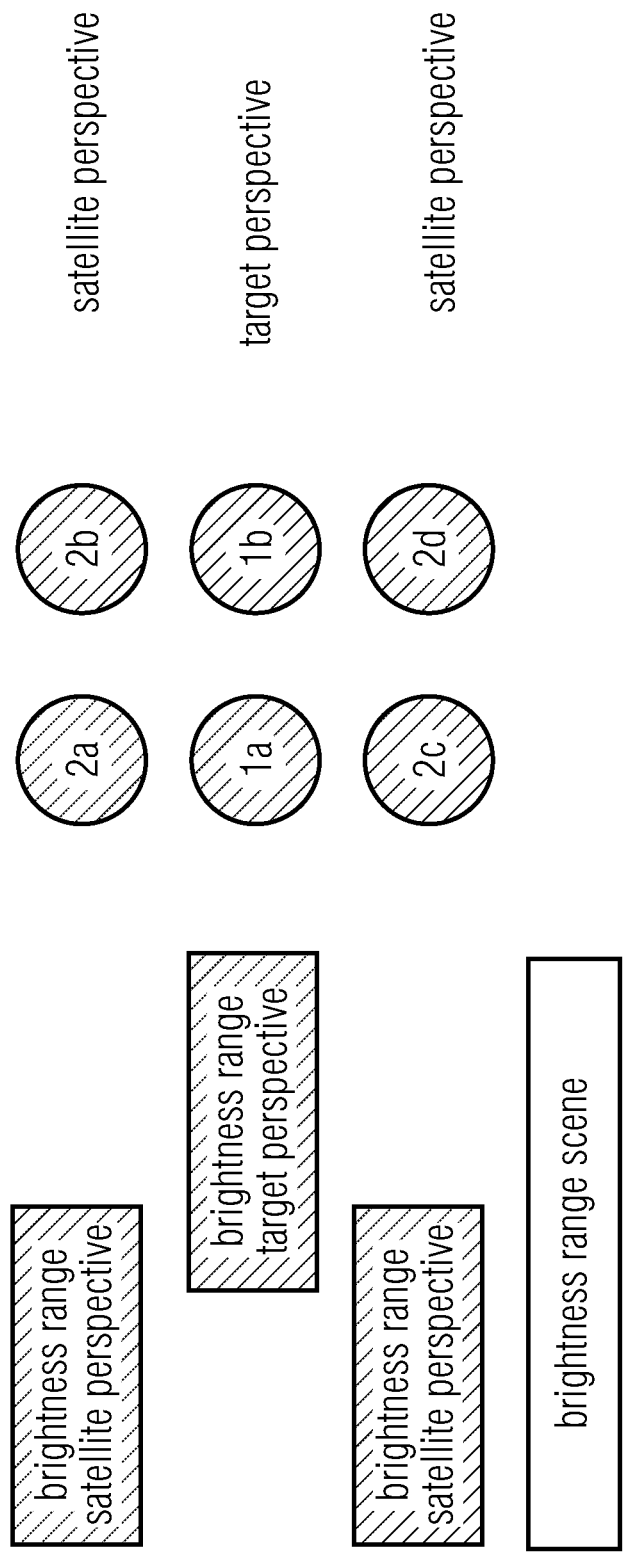
FIG. 14 illustrates an alternative camera configuration of a system according to an embodiment for another improved output of two target perspectives.

Moreover, FIG. 14 illustrates an alternative camera configuration of a system according to an embodiment for another improved output of two target perspectives.

Embodiments employ a minimum number of cameras for generating the target perspective or a number of target perspectives. More cameras are made available for the satellite perspective so that masking can be resolved better. By some embodiments, this is achieved by making available two cameras for each target perspective and each brightness range of the satellite perspective such that a connecting line there between crosses the respective target perspective.

Figure 5:
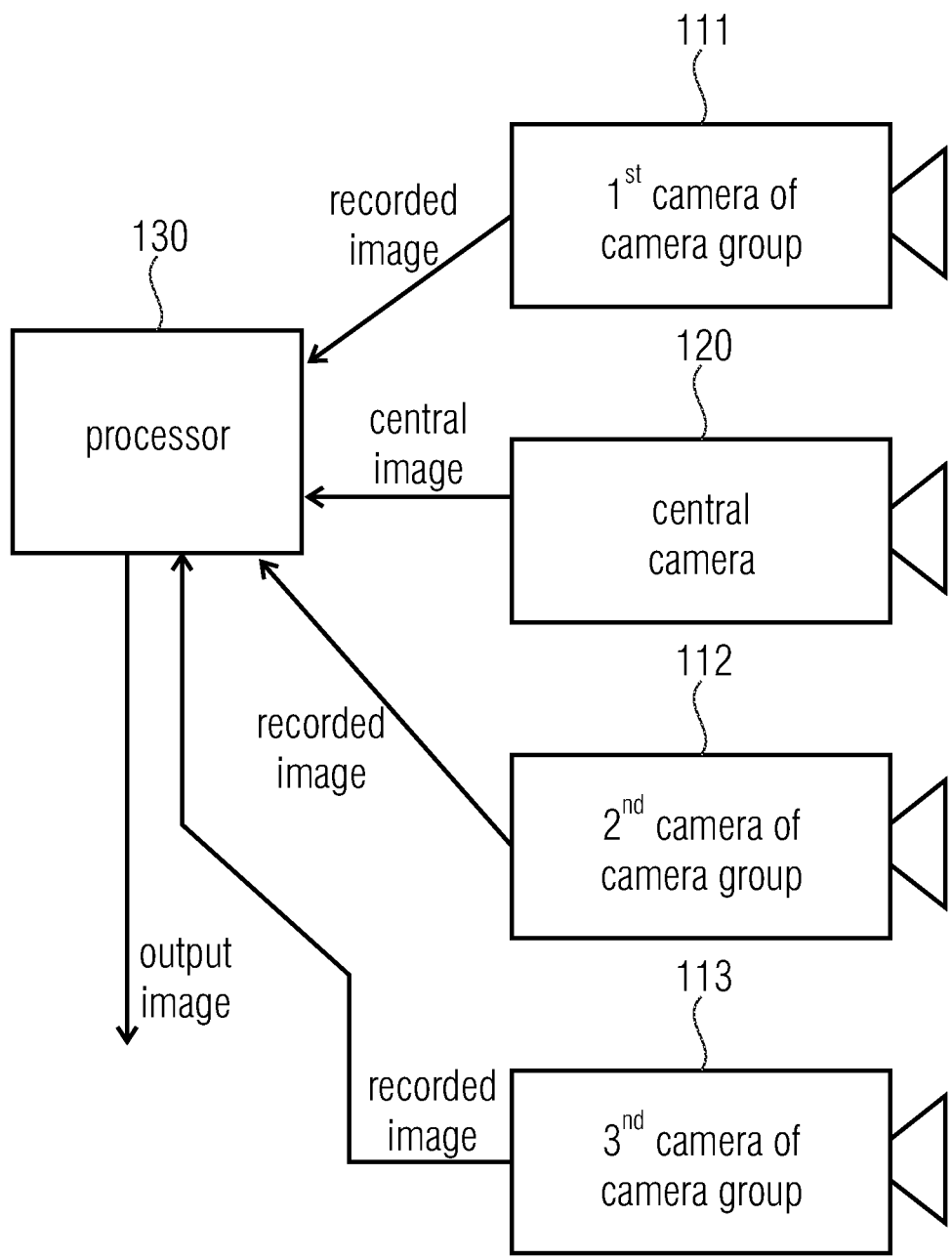
FIG. 5 illustrates a system for generating an output image according to a further embodiment.

FIG. 5 illustrates a system for generating an output image according to an embodiment.

The system comprises a camera group, wherein the camera group comprises three cameras 111, 112, 113, wherein each camera of said three cameras 111, 112, 113 is configured to record a portion of a scene to obtain a recorded image of said camera of said camera group.

Moreover, the system comprises a central camera 120, being located at a central-camera position, wherein the central camera is configured to record a central-camera-recorded portion of the scene, to obtain a central image.

Furthermore, the system comprises a processor 130 for generating the output image.

Each camera 111, 112, 113 of said camera group records a brightness range, being assigned to said camera, which may, for example, be the same brightness range for each of the cameras 111, 112, 113 of said camera group, when recording the portion of the scene.

The central camera 120 is configured to record a central-camera brightness range when recording the central-camera-recorded portion of the scene.

The brightness range of each camera 111, 112, 113 of said camera group is different from the central-camera brightness range of the central camera 120. In embodiments, where more than one camera group exists, the brightness range of the cameras of one camera group is different from the brightness range of each camera of any other camera group of the one or more camera group.

The processor 130 is configured to transform the recorded image of each camera 111, 112, 113 of said camera group or a portion of the recorded image of each camera 111, 112, 113 of said camera group, depending on the recorded image of each other camera 111, 112, 113 of said camera group and depending on the central-camera position of the central camera 120, to obtain a first transformed image of said camera group.

Furthermore, the processor 130 is configured to generate the output image by combining the central image and each transformed image of each of the one or more camera groups.

In such an embodiment, regarding the cameras of the satellite perspective, it is ensured by means of a corresponding selection of filter/exposure time that all the objects which are not located in the brightness range of the central camera can be seen in at least two cameras.

Figure 6:
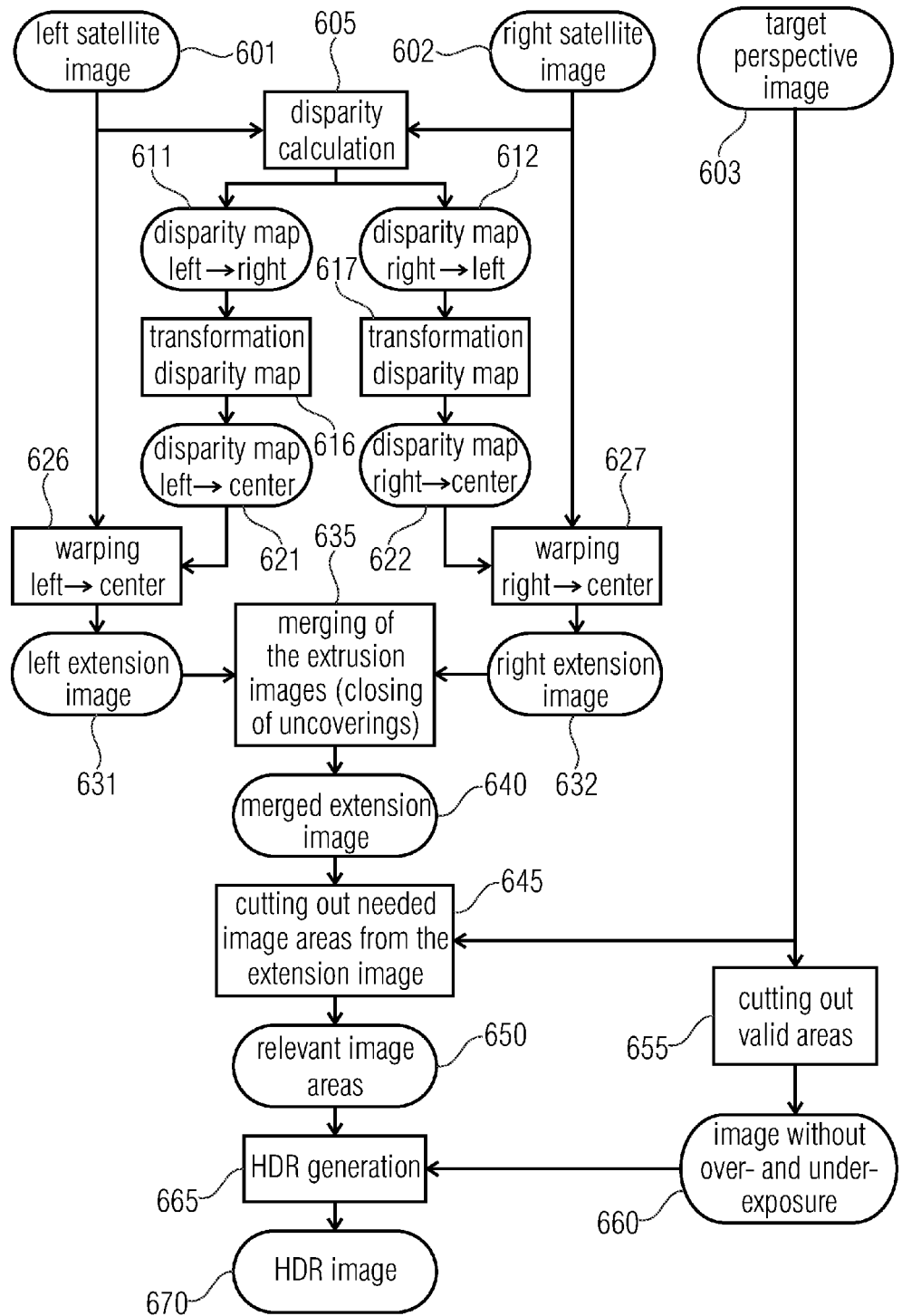
FIG. 6 illustrates a flow chart for determining an output image according to an embodiment.

FIG. 6 illustrates a flow chart for determining an output image according to an embodiment.

A left satellite image 601 and a right satellite image 602 are used for disparity calculation 605. A first disparity map "left→right" 611 and a second disparity map "right→left" 612 results. The first disparity map "left→right" 611 is transformed in step 616 to obtain a third disparity map "left→center" 621. Although, reference is made to the word "center" or central", it should be noted, that the central camera does not necessarily have to be located in the middle or between all satellite cameras. The second disparity map "right→left" 612 is transformed in step 617 to obtain a fourth disparity map "right→center" 622. Based on the third disparity map "left→center" 621, warping "left→center" is conducted on the left satellite image 601 in step 626 to obtain a left extension image 631. Based on the fourth disparity map "right→center" 622, warping "right→center" is conducted on the right satellite image 602 in step 627 to obtain a right extension image 632. Then, in step 635 merging of the left extension image 631 and the right extension image 632 is conducted, what eliminates uncovering, to obtain a merged extension image 640. In step 645, the needed image areas are cut out from the merged extension image 640 depending on a target perspective image 603 (the image recorded by the central camera) to obtain the relevant image areas 650. Moreover, in step 655, valid areas are cut out from the target perspective image 603 to obtain a target perspective image without overexposure and without underexposure 660. The HDR image 670 is then generated in step 665 from the target perspective image without overexposure and without underexposure 660 and from the relevant image areas 650.

According to the embodiment of FIG. 6, two disparity maps 621, 622 ("left→center" 621, and "right→center" 622) are generated. These disparity maps 621, 622 describe for each pixel of the left image 601/the right image 602 by how many pixels said pixel has to be shifted so as to be transferred to the perspective of the central camera/reference camera.

This means that then both the left image 601 and the right image 602 may be transformed as if being recorded from the perspective of the central camera/reference camera.

Due to the masking problem, this is not possible perfectly. Uncovering here describes image areas which are seen from the perspective of the central camera, but not from the perspective of the satellite cameras.

Merging the extension images in step 635 thus tries to eliminate uncovering in the left extension image 601 by information from the right extension image 602 (or vice versa). In addition, areas visible in both satellite images may be averaged so as to reduce noise. Finally, inconsistencies between the two satellite images 601, 602 may be made use of for reducing image errors.

The areas required are then cut out from the merged extension image 640 in step 645. These required areas will of course be in particular those areas which are overexposed or underexposed in the image of the central camera. But other areas may also be considered, aiming at reducing noise by combining several recordings.

In alternative embodiments, a modified flow chart is employed such that parts of the extension images which are not required are not calculated at all.

E.g., for each pixel of the plurality of pixels of the central image, it may, for example, be determined, whether said pixel is overexposed or underexposed, and, depending on whether said pixel is overexposed or underexposed, the processor is configured to transform one or more pixels of the plurality of pixels of the first recorded image or of the second recorded image of at least one of the one or more camera pairs, to generate the output image.

Finally, the cut out extension image 650 and the image of the central camera 660 are merged to form an HDR recording, possibly considering the camera response functions. All overexposed and underexposed areas which would impair merging have been removed, before, in step 655.

To conduct warping, the left and right satellite images and a sub-pixel-accurate disparity map are provided. The (sub-pixel-accurate) disparity map describes by how many pixels each pixel of the input image has to be shifted so as to be transferred to the perspective of the central camera. After applying the disparity map on the (left and right) input image, the result will be an irregular grid of pixel points (sub-pixel-accurate forward warping). By interpolation, this in turn is transferred to a regular grid by means of interpolation.

To recognize covered areas, before the actual interpolation, it has to be examined whether pixels, after being shifted by the disparity, are covered by other shifted pixels.

According to an embodiment, the processor 130 may be configured to transform the plurality of pixels of the first recorded image to obtain the plurality of pixels of the output image, by shifting each pixel of the at least some of the plurality of pixels of the first recorded image to a position of one of the plurality of pixels of the output image. The processor 130 may configured to determine, whether two of the plurality of pixels of the first recorded image have been shifted to the same position of one of the plurality of pixels of the output image.

Figure 15:
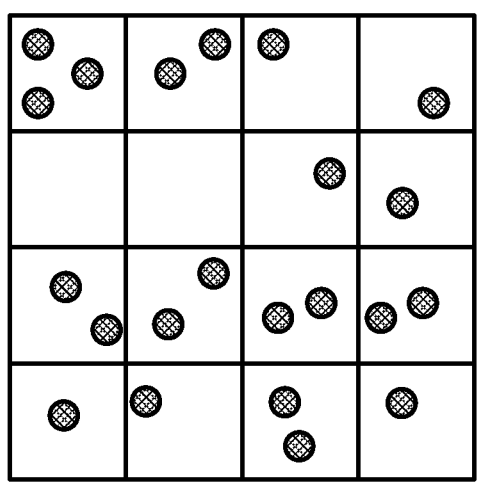
FIG. 15 illustrates the detection of covered areas according to an embodiment.

FIG. 15 illustrates the detection of covered areas according to an embodiment. The rectangles correspond to the regular grid of the target image after interpolation. The points show the irregular pixel grid after disparity correction, which are the basis for interpolation.

Since large disparity values correspond to the foreground, all the pixels (illustrated as circles in FIG. 15) in a rectangle the disparity of which is below the disparity maximum of all the pixels in the rectangle by a threshold value, are removed.

In an alternative embodiment, pixels which are "overtaken" by others (pixels change their order) may simply be removed.

Each rectangle of the rectangles which has no points is classified as an uncovering.

An alternative solution approach for warping is presented in [2]. In this case the image itself is not warped in a forward direction in a sub-pixel-accurate manner, but the depth maps are transformed using forward warping. Then, the image itself may be processed by means of sub-pixel-accurate backward warping. Such an approach for warping may alternatively be employed.

Forward warping of the depth map also results in an irregular pixel grid which has to be transferred to a regular pixel grid by means of interpolation.

Employing embodiments of the present invention, a reliable disparity estimation and correction is achieved. Moreover, the probability of satellite cameras not seeing image parts and consequently improved quality of the target image or target video is reduced. Furthermore, an overlapping of brightness ranges between the cameras may be very small. This results in a high overall dynamic range. Moreover, using disparity estimators is possible, wherein the disparity estimators do not have to be conditioned to processing images of different brightness. This improves the overall quality. Furthermore, image noise is reduced by combining two images. This is of particular relevance when using the satellite cameras for imaging bright image details. In this case, pixel values thereof may be multiplied by a number greater than one, thereby amplifying noise. This in turn may be reduced to some extent by averaging the two satellite images.

Embodiments may, for example, be applied for generating video of a high dynamic range, for monitoring, for movies or television or for other usage of a light field array.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding unit or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of embodiments can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to embodiments comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although each claim only refers back to one single claim, the disclosure also covers any conceivable combination of claims.

REFERENCES

[1] Rafal Mantiuk, Grzegorz Krawczyk, Radoslow Mantiuk, and Hans-Peter Seidel. High dynamic range imaging pipeline: perception-motivated representation of visual content. In Human Vision and Electronic Imaging XII, 2007
[2] Christian Riechert, Frederik Zilly, Peter Kauff, Jens Gather, Ralf Schäfer. Fully Automatic Stereo-To-Multiview Conversion in autostereoscopic displays. IBC 20123
[3] Jennifer Bonnard and Céline Loscos and Gilles Valette and Jean-Michel Nourrit and Laurent Lucas, "High-dynamic range video acquisition with a multiview camera", Optics, Photonics, and Digital Technologies for Multimedia applications II, 2012
[4] U.S. Pat. No. 8,208,048 B2, "Method for High Dynamic Range Imaging", Date of Patent: Jun. 26, 2012
[5] WO 03/083773 A2, "Imaging Method and System", Publication Date: Oct. 9, 2003
[6] U.S. Pat. No. 7,495,699 B2, "Imaging Method and System", Date of Patent: Feb. 24, 2009
[7] US2012/0162366 A1, "3D Cameras for HDR", Publication Date: Jun. 28, 2012

The invention claimed is:

1. A system for generating an output image, wherein the system comprises:
one or more camera pairs, wherein each camera pair of the one or more camera pairs comprises a first camera and a second camera, wherein said first camera is located at a first position, wherein said first camera is configured to record a first portion of a scene to obtain a first recorded image of said camera pair, wherein said second camera is located at a second position, being different from said first position, and wherein said second camera is configured to record a second portion of the scene, being different from the first portion of the scene, to obtain a second recorded image of said camera pair, a central camera, being located at a central-camera position, wherein the central camera is configured to record a central-camera-recorded portion of the scene, to obtain a central image, and a processor for generating the output image, wherein, for each camera pair of the one or more camera pairs, the first camera of said camera pair is configured to record a first brightness range, being assigned to said first camera, when recording the first portion of the scene, wherein the central camera is configured to record a central-camera brightness range when recording the central-camera-recorded portion of the scene, wherein the first brightness range of the first camera of each camera pair of the one or more camera pairs is different from the central-camera brightness range of the central camera, and is different from the first brightness range of the first camera of any other camera pair of the one or more camera pairs, wherein, for each camera pair of the one or more camera pairs, the processor is configured to transform, depending on the second recorded image of said camera pair and depending on the central-camera position of the central camera, the first recorded image of said camera pair or a portion of the first recorded image of said camera pair, to obtain a first transformed image of said camera pair, wherein, for each camera pair of the one or more camera pairs, the processor is configured to transform, depending on the first recorded image of said camera pair and depending on the central-camera position of the central camera, the second recorded image of said camera pair or a portion of the second recorded image of said camera pair, to obtain a second transformed image of said camera pair, and wherein the processor is configured to generate the output image by combining the central image and the first transformed image and the second transformed image of each of the one or more camera pairs.

2. A system according to claim 1,
wherein, for each camera pair of the one or more camera pairs, the first camera of said camera pair is configured to record the first brightness range, being assigned to said first camera, when recording the first portion of the scene, and the second camera of said camera pair is configured to record a second brightness range, being assigned to said second camera, when recording the second portion of the scene, wherein said second brightness range of said second camera is equal to said first brightness range of said first camera.

3. A system according to claim 2, wherein the system comprises at least two camera pairs, wherein the first brightness range of the first camera of each camera pair of the one or more camera pairs is different from the first brightness range of the first camera of any other camera pair of the one or more camera pairs.

4. A system according to claim 1, wherein, for each camera pair of the one or more camera pairs, the first camera of said camera pair is located at the first position and the second camera of said camera pair is located at the second position, such that a first distance between the first position of said first camera and the central-camera position of the central camera is smaller than a second distance between the first position of said first camera and the second position of said second camera, and such that a third distance between the second position of said second camera and the central-camera position of the central camera is smaller than the second distance between the first position of said first camera and the second position of said second camera.

5. A system according to claim 1, wherein the first camera of each camera pair of the one or more camera pairs, the second camera of each camera pair of the one or more camera pairs, and the central camera are arranged such that a straight line exists such that the first camera of each camera pair of the one or more camera pairs, the second camera of each camera pair of the one or more camera pairs, and the central camera lie on said straight line.

6. A system according to claim 1,
wherein, for each camera pair of the one or more camera pairs, the first camera of said camera pair is located at the first position and the second camera of said camera pair is located at the second position, such that a first distance between the first position of said first camera and the central-camera position of the central camera is smaller than a second distance between the first position of said first camera and the second position of said second camera, and such that a third distance between the second position of said second camera and the central-camera position of the central camera is smaller than the second distance between the first position of said first camera and the second position of said second camera, and wherein the first camera of each camera pair of the one or more camera pairs, the second camera of each camera pair of the one or more camera pairs, and the central camera are arranged such that a straight line exists such that the first camera of each camera pair of the one or more camera pairs, the second camera of each camera pair of the one or more camera pairs, and the central camera lie on said straight line.

7. A system according to claim 1,
wherein the first recorded image of each camera pair of the one or more camera pairs comprises a plurality of pixels, wherein the second recorded image of each camera pair of the one or more camera pairs comprises a plurality of pixels, and wherein the central image comprises a plurality of pixels, wherein the processor is configured to determine for each pixel of the plurality of pixels of the central image, whether said pixel is overexposed or underexposed, and, depending on whether said pixel is overexposed or underexposed, the processor is configured to transform one or more pixels of the plurality of pixels of the first recorded image or of the second recorded image of at least one of the one or more camera pairs, to generate the output image.

8. A system according to claim 1,
wherein, for each camera pair of the one or more camera pairs, the processor is configured to determine disparity information depending on the first image of said camera pair and depending on the second image of said camera pair, wherein the processor is configured to transform, depending on said disparity information, the first recorded image of said camera pair or a portion of the first recorded image of said camera pair, and wherein the processor is configured to transform, depending on said disparity information, the second recorded image of said camera pair or a portion of the second recorded image of said camera pair, to generate the output image.

9. A system according to claim 8, wherein, for each camera pair of the one or more camera pairs, the processor is configured determine a disparity map as the disparity information, depending on the first image of said camera pair and depending on the second image of said camera pair.

10. A system according to claim 9,
wherein, for each camera pair of the one or more camera pairs, the processor is configured to transform, depending on said disparity map, the first recorded image of said camera pair or a portion of the first recorded image of said camera pair, by shifting one or more pixels of the first recorded image depending on said disparity map, to generate the output image, and
wherein, for each camera pair of the one or more camera pairs, the processor is configured to transform, depending on said disparity map, the second recorded image of said camera pair or a portion of the second recorded image of said camera pair, by shifting one or more pixels of the second recorded image depending on said disparity map, to generate the output image.

11. A system according to claim 8,
wherein, for each camera pair of the one or more camera pairs, the processor is configured to determine a first disparity map and a second disparity map as the disparity information, depending on the first image of said camera pair and depending on the second image of said camera pair,
wherein, for each camera pair of the one or more camera pairs, the processor is configured to transform, depending on said first disparity map, the first recorded image of said camera pair or a portion of the first recorded image of said camera pair, by shifting one or more pixels of the first recorded image depending on said first disparity map, and
wherein, for each camera pair of the one or more camera pairs, the processor is configured to transform, depending on said second disparity map, the second recorded image of said camera pair or a portion of the second recorded image of said camera pair, by shifting one or more pixels of the second recorded image depending on said second disparity map.

12. A system according to claim 11, wherein the processor is configured to compare the first transformed image and the second transformed image of each camera pair of the one or more camera pair to detect a transformation error.

13. A system for generating a first output image and a second output image, wherein the system comprises:
one or more camera pairs, wherein each camera pair of the one or more camera pairs comprises a first camera and a second camera, wherein said first camera is located at a first position, wherein said first camera is configured to record a first portion of a scene to obtain a first recorded image of said camera pair, wherein said second camera is located at a second position, being different from said first position, and wherein said second camera is configured to record a second portion of the scene, being different from the first portion of the scene, to obtain a second recorded image of said camera pair,
a first central camera, being located at a first central-camera position, wherein the first central camera is configured to record a first central-camera-recorded portion of the scene, to obtain a first central image,
a second central camera, being located at a second central-camera position, wherein the second central camera is configured to record a second central-camera-recorded portion of the scene, to obtain a second central image,
a processor for generating the first output image and for generating the second output image,
wherein, for each camera pair of the one or more camera pairs, the first camera of said camera pair is configured to record a first brightness range, being assigned to said first camera, when recording the first portion of the scene,
wherein the first central camera is configured to record a first central-camera brightness range when recording the first central-camera-recorded portion of the scene,
wherein the second central camera is configured to record a second central-camera brightness range when recording the second central-camera-recorded portion of the scene,
wherein the first brightness range of the first camera of each camera pair of the one or more camera pairs is different from the first central-camera brightness range of the first central camera, is different from the second central-camera brightness range of the second central camera, and is different from the first brightness range of the first camera of any other camera pair of the one or more camera pairs,
wherein, for each camera pair of the one or more camera pairs, the processor is configured to transform, depending on the second recorded image of said camera pair and depending on the first central-camera position of the first central camera, the first recorded image of said camera pair or a portion of the first recorded image of said camera pair, to obtain a first transformed image of said camera pair,
wherein, for each camera pair of the one or more camera pairs, the processor is configured to transform, depending on the first recorded image of said camera pair and depending on the first central-camera position of the first central camera, the second recorded image of said camera pair or a portion of the second recorded image of said camera pair, to obtain a second transformed image of said camera pair,
wherein the processor is configured to generate the first output image by combining the first central image and the first transformed image and the second transformed image of each of the one or more camera pairs,
wherein, for each camera pair of the one or more camera pairs, the processor is configured to transform, depending on the second recorded image of said camera pair and depending on the second central-camera position of the second central camera, the first recorded image of said camera pair or a portion of the first recorded image of said camera pair, to obtain a third transformed image of said camera pair,
wherein, for each camera pair of the one or more camera pairs, the processor is configured to transform, depending on the first recorded image of said camera pair and depending on the second central-camera position of the second central camera, the second recorded image of said camera pair or a portion of the second recorded image of said camera pair, to obtain a fourth transformed image of said camera pair,
wherein the processor is configured to generate the second output image by combining the second central image and the third transformed image and the fourth transformed image of each of the one or more camera pairs.

14. A system for generating an output image, wherein the system comprises:
one or more camera groups, wherein each camera group of the one or more camera groups comprises two or more cameras, wherein each camera of said two or more cameras is configured to record a portion of a scene to obtain a recorded image of said camera of said camera group, wherein at least one of the one or more camera groups comprises three or more cameras, a central camera, being located at a central-camera position, wherein the central camera is configured to record a central-camera-recorded portion of the scene, to obtain a central image, and a processor for generating the output image, wherein, for each camera group of the one or more camera groups, each camera of said camera group records a brightness range, being assigned to said camera, when recording the portion of the scene, wherein the central camera is configured to record a central-camera brightness range when recording the central-camera-recorded portion of the scene, wherein the brightness range of each camera of each camera group of the one or more camera groups, is different from the central-camera brightness range of the central camera, and is different from the brightness range of each camera of any other camera group of the one or more camera groups, wherein, for each camera group of the one or more camera groups, the processor is configured to transform, depending on the recorded image of a second camera of said camera group and depending on the central-camera position of the central camera, the recorded image of a first camera of said camera group or a portion of the recorded image of said first camera of said camera group, to obtain a first transformed image of said camera group, wherein, for each camera group of the one or more camera groups, the processor is configured to transform, depending on the recorded image of a first camera of said camera group and depending on the central-camera position of the central camera, the recorded image of a second camera of said camera group or a portion of the recorded image of said second camera of said camera group, to obtain a second transformed image of said camera group, and wherein the processor is configured to generate the output image by combining the central image and the first transformed image and the second transformed image of each of the one or more camera groups.

15. A method for generating an output image, wherein the method comprises:

recording, for each camera pair of one or more camera pairs, a first portion of a scene by a first camera of said camera pair, to obtain a first recorded image of said camera pair, wherein said first camera is located at a first position, recording, for each camera pair of the one or more camera pairs, a second portion of a scene by a second camera of said camera pair, to obtain a second recorded image of said camera pair, wherein said second camera is located at a second position, being different from the first position of the first camera of said camera pair, recording by a central camera a central-camera-recorded portion of the scene to obtain a central image, wherein the central camera is located at a central-camera position, and generating the output image, wherein, for each camera pair of the one or more camera pairs, recording the first portion of the scene by the first camera of said camera pair is conducted by recording a first brightness range, being assigned to said first camera, when recording the first portion of the scene, wherein recording the central-camera-recorded portion of the scene by the central camera is conducted by recording a central-camera brightness range when recording the central-camera-recorded portion of the scene, wherein the first brightness range of the first camera of each camera pair of the one or more camera pairs is different from the central-camera brightness range of the central camera, and is different from the first brightness range of the first camera of any other camera pair of the one or more camera pairs, wherein generating the output image is conducted, for each camera pair of the one or more camera pairs, by transforming, depending on the second recorded image of said camera pair and depending on the central-camera position of the central camera, the first recorded image of said camera pair or a portion of the first recorded image of said camera pair, to obtain a first transformed image of said camera pair, wherein generating the output image is conducted, for each camera pair of the one or more camera pairs, by transforming, depending on the first recorded image of said camera pair and depending on the central-camera position of the central camera, the second recorded image of said camera pair or a portion of the second recorded image of said camera pair, to obtain a second transformed image of said camera pair, and wherein generating the output image is conducted by combining the central image and the first transformed image and the second transformed image of each of the one or more camera pairs.

16. A method for generating a first output image and a second output image, wherein the method comprises:

recording, for each camera pair of one or more camera pairs, a first portion of a scene by a first camera of said camera pair, to obtain a first recorded image of said camera pair, wherein said first camera is located at a first position, recording, for each camera pair of the one or more camera pairs, a second portion of a scene by a second camera of said camera pair, to obtain a second recorded image of said camera pair, wherein said second camera is located at a second position, being different from the first position of the first camera of said camera pair, recording by a first central camera a first central-camera-recorded portion of the scene to obtain a first central image, wherein the first central camera is located at a first central-camera position, recording by a second central camera a second central-camera-recorded portion of the scene to obtain a second central image, wherein the second central camera is located at a second central-camera position, generating the first output image, and generating the second output image, wherein, for each camera pair of the one or more camera pairs, recording the first portion of the scene by the first camera of said camera pair is conducted by recording a first brightness range, being assigned to said first camera, when recording the first portion of the scene, wherein recording the first central-camera-recorded portion of the scene by the first central camera is conducted by recording a first central-camera brightness range when recording the first central-camera-recorded portion of the scene, wherein recording the second central-camera-recorded portion of the scene by the second central camera is conducted by recording a second central-camera brightness range when recording the second central-camera-recorded portion of the scene, wherein the first brightness range of the first camera of each camera pair of the one or more camera pairs is different from the first central-camera brightness range of the first central camera, is different from the second central-camera brightness range of the second central camera, and is different from the first brightness range of the first camera of any other camera pair of the one or more camera pairs, wherein generating the first output image is conducted, for each camera pair of the one or more camera pairs, by transforming, depending on the second recorded image of said camera pair and depending on the first central-camera position of the first central camera, the first recorded image of said camera pair or a portion of the first recorded image of said camera pair, to obtain a first transformed image of said camera pair, wherein generating the first output image is conducted, for each camera pair of the one or more camera pairs, by transforming, depending on the first recorded image of said camera pair and depending on the first central-camera position of the first central camera, the second recorded image of said camera pair or a portion of the second recorded image of said camera pair, to obtain a second transformed image of said camera pair, and wherein generating the first output image is conducted by combining the first central image and the first transformed image and the second transformed image of each of the one or more camera pairs, wherein generating the second output image is conducted, for each camera pair of the one or more camera pairs, by transforming, depending on the second recorded image of said camera pair and depending on the second central-camera position of the second central camera, the first recorded image of said camera pair or a portion of the first recorded image of said camera pair, to obtain a third transformed image of said camera pair, wherein generating the second output image is conducted, for each camera pair of the one or more camera pairs, by transforming, depending on the first recorded image of said camera pair and depending on the second central-camera position of the second central camera, the second recorded image of said camera pair or a portion of the second recorded image of said camera pair, to obtain a fourth transformed image of said camera pair, and wherein generating the second output image is conducted by combining the second central image and the third transformed image and the fourth transformed image of each of the one or more camera pairs.

17. A method for generating an output image, wherein the method comprises:

recording, by each camera of each camera group of two or more camera groups, a portion of a scene to obtain a recorded image of said camera of said camera group, wherein at least one of the one or more camera groups comprises three or more cameras, recording by a central camera a central-camera-recorded portion of the scene to obtain a central image, wherein the central camera is located at a central-camera position, and generating the output image, wherein, for each camera group of the one or more camera groups, recording the portion of the scene by each camera of said camera group is conducted by recording a brightness range, being assigned to said camera, when recording the portion of the scene, wherein recording the central-camera-recorded portion of the scene by the central camera is conducted by recording a central-camera brightness range when recording the central-camera-recorded portion of the scene, wherein the brightness range of each camera of each camera group of the one or more camera groups, is different from the central-camera brightness range of the central camera, and is different from the brightness range of each camera of any other camera group of the one or more camera group, wherein generating the output image is conducted, for each camera group of the one or more camera groups, by transforming, depending on the recorded image of a second camera of said camera group and depending on the central-camera position of the central camera, the recorded image of a first camera of said camera group or a portion of the recorded image of said first camera of said camera group, to obtain a first transformed image of said camera group, and wherein generating the output image is conducted, for each camera group of the one or more camera groups, by transforming, depending on the recorded image of a first camera of said camera group and depending on the central-camera position of the central camera, the recorded image of a second camera of said camera group or a portion of the recorded image of said second camera of said camera group, to obtain a second transformed image of said camera group, and wherein generating the output image is conducted by combining the central image and the first transformed image and the second transformed image of each of the one or more camera group.

18. A non-transitory computer readable medium including a computer program for implementing the method of claim 15 when being executed on a computer or signal processor.

19. A non-transitory computer readable medium including a computer program for implementing the method of claim 16 when being executed on a computer or signal processor.

20. A non-transitory computer readable medium including a computer program for implementing the method of claim 17 when being executed on a computer or signal processor.

* * * * *

UNITED STATES PATENT AND TRADEMARK OFFICE
CERTIFICATE OF CORRECTION

| | | |
|---|---|---|
| PATENT NO. | : 8,811,811 B1 | Page 1 of 1 |
| APPLICATION NO. | : 13/945368 | |
| DATED | : August 19, 2014 | |
| INVENTOR(S) | : Marcus Wetzel et al. | |

It is certified that error appears in the above-identified patent and that said Letters Patent is hereby corrected as shown below:

On the Title Page

Please correct item (73) on the patent as follows:

"Fraunhofer-Gesellschaft zur Foerderung der angewandten Forschung e.V."

Signed and Sealed this
Twenty-seventh Day of January, 2015

Michelle K. Lee
*Deputy Director of the United States Patent and Trademark Office*